US010064161B2

(12) United States Patent
Takeda et al.

(10) Patent No.: US 10,064,161 B2
(45) Date of Patent: Aug. 28, 2018

(54) USER TERMINAL, RADIO BASE STATION APPARATUS, RADIO COMMUNICATION SYSTEM AND RADIO COMMUNICATION METHOD

(75) Inventors: Kazuaki Takeda, Tokyo (JP); Tetsushi Abe, Tokyo (JP); Yoshihisa Kishiyama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 234 days.

(21) Appl. No.: 14/115,270

(22) PCT Filed: Feb. 17, 2012

(86) PCT No.: PCT/JP2012/053829
§ 371 (c)(1),
(2), (4) Date: Nov. 22, 2013

(87) PCT Pub. No.: WO2012/150666
PCT Pub. Date: Nov. 8, 2012

(65) Prior Publication Data
US 2014/0086189 A1    Mar. 27, 2014

(30) Foreign Application Priority Data

May 2, 2011 (JP) .................................. 2011-103172

(51) Int. Cl.
*H04W 72/04* (2009.01)
*H04L 5/00* (2006.01)
(Continued)

(52) U.S. Cl.
CPC ........... *H04W 72/0406* (2013.01); *H04L 1/06* (2013.01); *H04L 1/1621* (2013.01);
(Continued)

(58) Field of Classification Search
CPC ................................................ H04W 72/0406
(Continued)

(56) References Cited

U.S. PATENT DOCUMENTS 8,897,240 B2* 11/2014 Nordstrom ............ H04L 1/1861
370/329
2010/0325509 A1* 12/2010 Kim ...................... H04L 1/1685
714/750
(Continued)

FOREIGN PATENT DOCUMENTS

EP          2302830 A2      3/2011
KR      2010-0112084 A    10/2010
WO      2008115004 A2      9/2008

OTHER PUBLICATIONS

International Search Report issued in PCT/JP2012/053829 dated Mar. 19, 2012 (2 pages).
(Continued)

*Primary Examiner* — Andrew Chriss
*Assistant Examiner* — Voster Preval
(74) *Attorney, Agent, or Firm* — Osha Liang LLP

(57) ABSTRACT

To provide a user terminal, radio base station apparatus, radio communication system and radio communication method that support increases in the number of users, a user terminal is provided with a reception section that receives a downlink control signal multiplexed into radio resources from the starting OFDM symbol to a predetermined OFDM symbol in a subframe, and a downlink control signal subjected to frequency division multiplexing with a downlink data signal into radio resources after the predetermined OFDM symbol, a retransmission check section that performs a retransmission check on the downlink data signal based on the downlink control signal subjected to frequency division multiplexing to output a retransmission response signal, and a selection section that selects a radio resource of an uplink control channel used in transmission of the retransmission response signal.

13 Claims, 18 Drawing Sheets

(51) Int. Cl.
*H04L 1/06* (2006.01)
*H04L 1/16* (2006.01)
*H04L 1/18* (2006.01)
H04B 7/024 (2017.01)
H04B 7/0452 (2017.01)
H04L 27/26 (2006.01)

(52) U.S. Cl.
CPC ......... *H04L 1/1861* (2013.01); *H04L 1/1864* (2013.01); *H04L 5/0055* (2013.01); *H04W 72/042* (2013.01); H04B 7/024 (2013.01); H04B 7/0452 (2013.01); H04L 5/0007 (2013.01); H04L 27/2626 (2013.01); H04L 27/2647 (2013.01)

(58) Field of Classification Search
USPC ........................................................ 370/329
See application file for complete search history.

(56) References Cited

U.S. PATENT DOCUMENTS

| | | | |
|---|---|---|---|
| 2011/0075624 A1 | 3/2011 | Papasakellariou et al. | |
| 2011/0299490 A1* | 12/2011 | Nordstrom | H04L 1/1861 |
| | | | 370/329 |
| 2012/0008586 A1 | 1/2012 | Kwon et al. | |
| 2012/0026935 A1* | 2/2012 | Park | H04L 1/1854 |
| | | | 370/315 |
| 2013/0039284 A1* | 2/2013 | Marinier | H04L 5/001 |
| | | | 370/329 |
| 2013/0265934 A1* | 10/2013 | Zeng | H04B 7/15528 |
| | | | 370/315 |
| 2013/0272258 A1* | 10/2013 | Lee | H04B 7/0413 |
| | | | 370/329 |

OTHER PUBLICATIONS

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9)"; Dec. 2009 (18 pages).
Notification of Decision to Grant a Patent from Japanese application No. 2011-103172 dated Mar. 29, 2013 (4 pages).
Extended Search Report issued in corresponding European Application No. 12779852.8, dated Nov. 24, 2014 (8 pages).
Huawei et al.; "Remaining details of FDD ACK/NACK channel selection"; 3GPP TSG RAN WG1 Meeting #64, R1-110897; Taipei, Taiwan; Feb. 21-25, 2011 (4 pages).
Office Action dated Oct. 27, 2016 in corresponding Chinese Patent Application No. 201280021443.8 (19 pages).
Search Report issued in the counterpart Indonesian Patent Application No. W00201305125-TA, dated Sep. 7, 2016 (4 pages).
Communication issued in the counterpart European Patent Application No. 12779852.8, dated Oct. 18, 2016 (4 pages).
Office Action issued in corresponding Canadian Application No. 2,834,762, dated Sep. 22, 2017 (4 pages).
Office Action issued in corresponding European Application No. 12779852.8, dated Oct. 6, 2017 (19 pages).

* cited by examiner

FORMAT 1A
(W/O SPATIAL MULTIPLEXING)

|     | Ch1 |
| --- | --- |
| DTX | 0   |
| N   | 1   |
| A   | -1  |

A : ACK
N : NACK

FIG. 5A

FORMAT 1B
(W/ SPATIAL MULTIPLEXING)

|      | Ch1 |
| ---  | --- |
| DTX  | 0   |
| N, N | 1   |
| N, A | -j  |
| A, N | j   |
| A, A | -1  |

A : ACK
N : NACK

FIG. 5B

| ARI | 00 | 01 | 10 | 11 | |
|---|---|---|---|---|---|
| UE#1 | R1 | R2 | R3 | R4 | NOTIFICATION FROM HIGHER LAYER |
| UE#2 | R1 | R2 | R3 | R4 | |
| UE#3 | R1 | R2 | R3 | R4 | |
| UE#4 | R1 | R2 | R3 | R4 | |
| UE#5 | R1 | R2 | R3 | R4 | |

MAPPING TABLE FOR 3 A/N bits

| ACK(0) | ACK(1) | ACK(2) | Ch1 | Ch2 | Ch3 |
|---|---|---|---|---|---|
| A | A | A |  | −1 |  |
| A | N/D | A |  | j |  |
| N/D | A | A |  | −j |  |
| N/D | N/D | A |  |  | −1 |
| A | A | N/D | −1 |  |  |
| A | N/D | N/D | j |  |  |
| N/D | A | N/D | −j |  |  |
| N/D | N/D | N |  |  | 1 |
| N | N/D | D | 1 |  |  |
| N/D | N | D | 1 |  |  |
| D | D | D | 0 | 0 | 0 |

A : ACK
N : NACK
D : DTX
N/D : NACK or DTX

FIG. 10A

MAPPING TABLE FOR 4 A/N bits

| ACK(0) | ACK(1) | ACK(2) | ACK(3) | Ch1 | Ch2 | Ch3 | Ch4 |
|---|---|---|---|---|---|---|---|
| A | A | A | A |  | −1 |  |  |
| A | N/D | A | A |  |  | −j |  |
| N/D | A | A | A |  | −j |  |  |
| N/D | N/D | A | A |  |  |  | −1 |
| A | A | A | N/D |  | j |  |  |
| A | N/D | A | N/D |  |  | 1 |  |
| N/D | A | A | N/D |  | 1 |  |  |
| N/D | N/D | A | N/D |  |  |  | j |
| A | A | N/D | A |  | −1 |  |  |
| A | N/D | N/D | A |  |  | j |  |
| N/D | A | N/D | A |  |  |  | −j |
| N/D | N/D | N/D | A |  |  |  | 1 |
| A | A | N/D | N/D | −1 |  |  |  |
| A | N/D | N/D | N/D | j |  |  |  |
| N/D | A | N/D | N/D | −j |  |  |  |
| N/D | N | N/D | N/D | 1 |  |  |  |
| N | N/D | N/D | N/D | 1 |  |  |  |
| D | D | N/D | N/D | 0 | 0 | 0 | 0 |

FIG. 10B

IMPLICIT RESOURCE DERIVED FROM
CCE INDEX OF PDCCH ON PCELL

EXPLICIT RESOURCE INDICATED BY ARI

| PCell | | SCell | | | | | |
|---|---|---|---|---|---|---|---|
| ACK(0) | ACK(1) | ACK(2) | ACK(3) | Ch1 | Ch2 | Ch3 | Ch4 |
| A | A | A | A | | −1 | | |
| A | N/D | A | A | | | −j | |
| N/D | A | A | A | | −j | | |
| N/D | N/D | A | A | | | | −1 |
| A | A | A | N/D | | j | | |
| A | N/D | A | N/D | | | 1 | |
| N/D | A | A | N/D | | 1 | | |
| N/D | N/D | A | N/D | | | | j |
| A | A | N/D | A | | | −1 | |
| A | N/D | N/D | A | | | j | |
| N/D | A | N/D | A | | | | −j |
| N/D | N/D | N/D | A | | | | 1 |
| A | A | N/D | N/D | −1 | | | |
| A | N/D | N/D | N/D | j | | | |
| N/D | A | N/D | N/D | −j | | | |
| N/D | N | N/D | N/D | 1 | | | |
| N | N/D | N/D | N/D | 1 | | | |
| D | D | N/D | N/D | 0 | 0 | 0 | 0 |

FIG. 12A

| Ch1 | Ch2 | Ch3 | Ch4 | ARI |
|---|---|---|---|---|
| R1 | R2 | R3 | R4 | 00 |
| R1 | R5 | R6 | R7 | 01 |
| R1 | R8 | R9 | R10 | 10 |
| R1 | R11 | R12 | R13 | 11 |

DESIGNATION BASED ON CCE INDEX
ASSOCIATED WITH ENHANCED PDCCH
SIGNAL of Pcell

NOTIFICATION FROM
HIGHER LAYER

FIG. 12B

USER TERMINAL, RADIO BASE STATION APPARATUS, RADIO COMMUNICATION SYSTEM AND RADIO COMMUNICATION METHOD

TECHNICAL FIELD

The present invention relates to a user terminal, radio base station apparatus, radio communication system and radio communication method in the next-generation radio communication system.

BACKGROUND ART

In UMTS (Universal Mobile Telecommunications System) networks, Long Term Evolution (LTE) has been studied for the purpose of providing higher data rates, low delay, etc. (Non-patent Document 1). In LTE, as a multiple access scheme, the scheme based on OFDMA (Orthogonal Frequency Division Multiple Access) is used in downlink, and the scheme based on SC-FDMA (Single Carrier Frequency Division Multiple Access) is used in uplink.

Further, for the purpose of providing wider bands and higher rates than in LTE, successor systems to LTE have also been studied (for example, also called LTE Advanced or LTE Enhancement) (herein after, referred to as "LTE-A"). In LTE (Rel. 8) and LTE-A (Rel. 9, Rel. 10), MIMO (Multi Input Multi Output) techniques are studied as radio communication techniques for transmitting and receiving data using a plurality of antennas and improving spectral efficiency. In MIMO systems, the transmitter/receiver is provided with a plurality of transmission/reception antennas, and simultaneously transmits different transmission information sequences from different transmission antennas.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

In addition, in successor systems (for example, Rel. 9, Rel. 10) to LTE, Multiple User MIMO (MU-MIMO) is specified in which transmission information sequences are simultaneously transmitted from different transmission antennas to different users. It has been studied applying the MU-MIMO transmission also to Hetnet (Heterogeneous network) and CoMP (Coordinated Multi-Point) transmission. Therefore, in the future systems, increases are expected in the number of users connected to a base station apparatus, and there is a fear that conventional radio resource allocation methods do not enable characteristics of the future systems such as MU-MIMO transmission to be exerted sufficiently.

The present invention was made in view of such a respect, and it is an object of the invention to provide a user terminal, radio base station apparatus, radio communication system and radio communication method that support increases in the number of users.

Solution to Problem

A user terminal of the invention is characterized by having a reception section that receives a downlink control signal multiplexed into radio resources from a starting OFDM symbol to a predetermined OFDM symbol in a subframe, and a downlink control signal subjected to frequency division multiplexing with a downlink data signal into radio resources after the predetermined OFDM symbol, a retransmission check section that performs a retransmission check on the downlink data signal based on the downlink control signal subjected to frequency division multiplexing to output a retransmission response signal, and a selection section that selects a radio resource of an uplink control channel used in transmission of the retransmission response signal.

A radio base station apparatus of the invention is characterized by having a signal generating section that generates a downlink control signal and a downlink data signal to a user terminal, a transmission section that multiplexes the downlink control signal into radio resources from a starting OFDM symbol to a predetermined OFDM symbol in a subframe, while performing frequency division multiplexing on the downlink control signal and the downlink data signal into radio resources after the number of predetermined OFDM symbols to transmit, and a reception section that receives a retransmission response signal of the downlink data signal subjected to a retransmission check in the user terminal based on the downlink control signal subjected to frequency division multiplexing.

A radio communication method of the invention is a radio communication method in which a radio base station apparatus transmits a downlink control signal and a downlink data signal generated therein to a user terminal, and the user terminal transmits a retransmission response signal to the downlink data signal received therein to the radio base station apparatus as feedback, and is characterized by having the step in the radio base station apparatus of multiplexing a downlink control signal into radio resources from a starting OFDM symbol to a predetermined OFDM symbol in a subframe, while performing frequency division multiplexing on a downlink control signal and a downlink data signal into radio resources after the number of predetermined OFDM symbols to transmit to the user terminal, and the steps in the user terminal of outputting a retransmission response signal to the downlink data signal based on the downlink control signal subjected to frequency division multiplexing, selecting a radio resource of an uplink control channel used in transmission of the retransmission response signal, and transmitting the retransmission response signal to the radio base station apparatus.

A radio communication system of the invention is a radio communication method in which a radio base station apparatus transmits a downlink control signal and a downlink data signal generated therein to a user terminal, and the user terminal transmits a retransmission response signal to the downlink data signal received therein to the radio base station apparatus as feedback, and is characterized in that the radio base station apparatus has a signal generating section that generates a downlink control signal and a downlink data signal to the user terminal, and a transmission section that multiplexes the downlink control signal into radio resources from a starting OFDM symbol to a predetermined OFDM symbol in a subframe, while performing frequency division multiplexing on the downlink control signal and the downlink data signal into radio resources after the number of predetermined OFDM symbols to transmit, and that the user terminal has a reception section that receives the downlink control signal subjected to frequency division multiplexing with the downlink data signal into radio resources after the predetermined OFDM symbol transmitted from the radio base station apparatus, a retransmission check section that performs a retransmission check on the downlink data signal based on the downlink control signal subjected to frequency division multiplexing to output a retransmission response signal, and a selection section that selects a radio resource of an uplink control channel used in transmission of the retransmission response signal.

Technical Advantage of the Invention

According to the invention, it is possible to provide the user terminal, radio base station apparatus, radio communication system and radio communication method that effectively cope with a lack of capacity of the downlink control channel associated with increases in the number of users.

BRIEF DESCRIPTION OF THE DRAWINGS

FIG. 5 contains diagrams illustrating mapping tables of retransmission response signals of PUCCH Format 1a/1b;

FIG. 10 contains diagrams illustrating one example of mapping tables to apply to transmission of retransmission response signals;

FIG. 12 contains diagrams to explain one example of the radio resource selection method according to the Embodiment;

DESCRIPTION OF EMBODIMENTS

Figure 1:
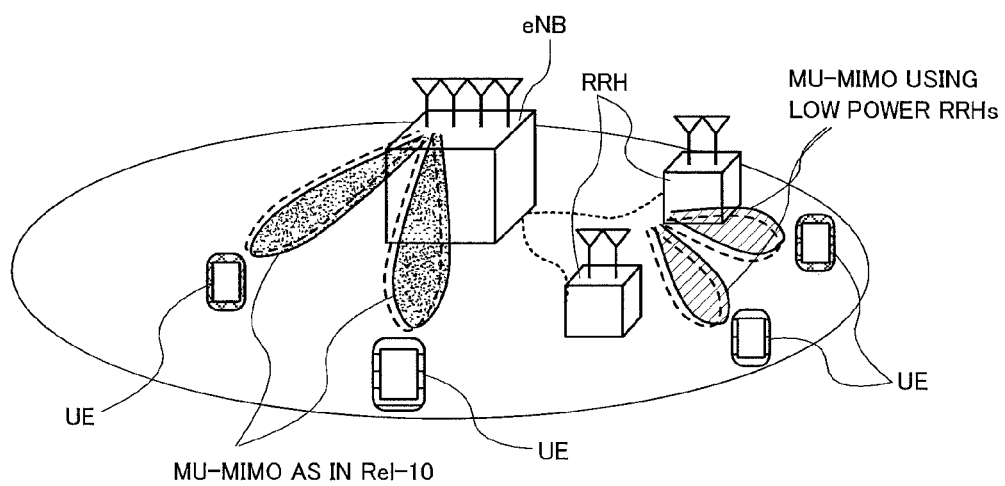
FIG. 1 is a schematic view of Hetnet to which is applied MU-MIMO.

FIG. 1 is a schematic view of Hetnet to which is applied MU-MIMO. A system as shown in FIG. 1 is configured hierarchically in which small base station apparatuses RRHs (Remote Radio Heads) each having a local cell are provided in a cell of a base station apparatus eNB (eNodeB). In downlink MU-MIMO transmission in such a system, data is simultaneously transmitted not only from a plurality of antennas of the base station apparatus eNB to a plurality of user terminals UEs (User Equipments), but also it is expected that data is simultaneously transmitted from a plurality of antennas of the small base station apparatus RRH to a plurality of user terminals UEs. In this case, control signals multiplexed into radio resources increase, and there is a possibility of a lack of capacity of the downlink control channel.

Figure 2:
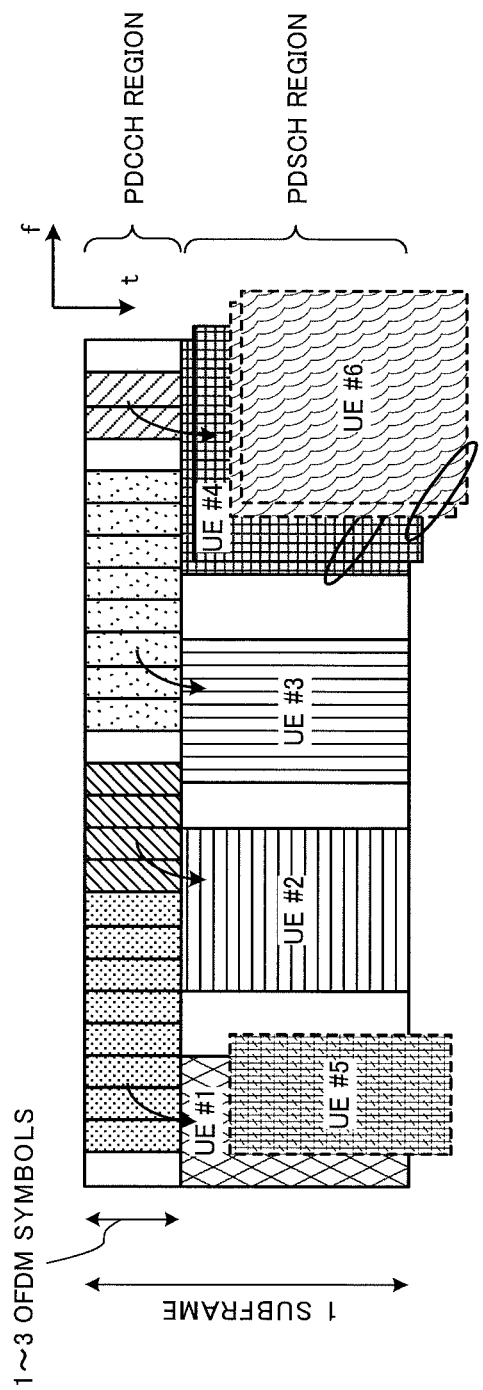
FIG. 2 is a diagram illustrating one example of a subframe in which downlink MU-MIMO transmission is performed.

As in the above-mentioned configuration and the like, spectral efficiency is improved by MU-MIMO, but there is a possibility that such a problem occurs that capacity of the downlink control channel lacks in the base station apparatus. FIG. 2 is a diagram illustrating one example of a subframe in which downlink MU-MIMO transmission is performed. In the subframe, signals of downlink data to user terminals UES and signals of downlink control information (DCI) to receive the downlink data are subjected to time division multiplexing and transmitted.

Further, predetermined OFDM symbols (1-3 OFDM symbols) from the starting of the subframe are reserved as a radio resource region (PDCCH region) for downlink control channels (PDCCH: Physical Downlink Control Channels). The PDCCH region is comprised of up to maximum 3 OFDM symbols from the starting of the subframe, and the number of OFDM symbols dynamically varies for each subframe (any of the numbers (1 to 3) of OFDM symbols is selected) corresponding to traffic information (for example, the number of connected users and the like). Furthermore, in radio resources after the predetermined number of symbols from the starting of the subframe, reserved is a radio resource region (PDSCH region) for downlink data channels (PDSCH: Physical Downlink Shared Channels).

Moreover, the DCI corresponding to each user terminal is assigned to the PDCCH region. In this case, such a case is conceivable that only the PDCCH region comprised of maximum 3 OFDM symbols from the starting in a subframe is not allowed to assign the downlink control information to all user terminals UEs. For example, in a radio resource allocation method as shown in FIG. 2, such a case is shown that the PDCCH region lacks due to increases of the PDCCH signal transmitted by each user, and that it is not possible to reserve allocation resources for the downlink control information for user terminals UEs #5 and #6. In this way, in the radio communication system that applies MU-MIMO transmission, a lack of allocation resources for downlink control signals is expected, and there is a problem with the effect on throughput characteristics of MU-MIMO transmission.

To resolve such a lack of the PDCCH region, it is conceivable to extend the PDCCH (extend the PDCCH region to the existing PDSCH region) to a region beyond the region of maximum 3 OFDM symbols from the beginning of a subframe. The inventor of the present invention arrived at an idea of frequency-division multiplexing downlink control signals and downlink data signals into radio resources after the number of predetermined symbols of a subframe, and thereby using a predetermined frequency region in the existing PDSCH region newly as a PDCCH region (also called the FDM type PDCCH or UE-PDCCH) (see FIG. 3).

Figure 3:
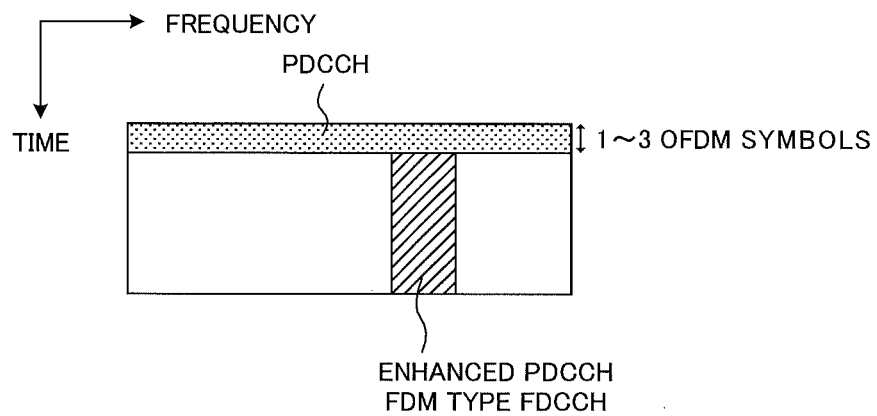
FIG. 3 is an explanatory diagram of enhanced PDCCH (FDM type PDCCH)

Further, in the case of extending the PDCCH region as shown in FIG. 3, the need is considered for studying feedback control of a retransmission response signal of a downlink control signal (herein after, also described as an "enhanced PDCCH signal") of a user terminal that performs transmission using the enhanced PDCCH region (herein after, also described as an "enhanced PDCCH"). For example, in the case of transmitting a retransmission response signal of a PDSCH signal that is retransmission-checked based on the enhanced PDCCH signal using an uplink control channel (PUCCH: Physical Uplink Control Channel), it is necessary to suitably select radio resources of the PUCCH assigned to each user terminal. In this case, such a method is considered that the radio base station apparatus designates a particular radio resource to notify a user terminal, but there is a fear that it is not possible to effectively exploit radio resources.

Particularly, in LTE systems, the configuration (carrier aggregation) is also studied to perform communications using a plurality of base frequency blocks (Component Carriers: CCs), and it is desired to perform optimal feedback of retransmission response signals corresponding to a communication environment. Therefore, the inventor of the present invention studied feedback control of retransmission responses of enhanced PDCCH signals in the case of extending the PDCCH region, and arrived at the invention. Feedback control of retransmission responses will specifically be described below.

Described first is one example of uplink transmission applicable to this Embodiment.

Figure 4:
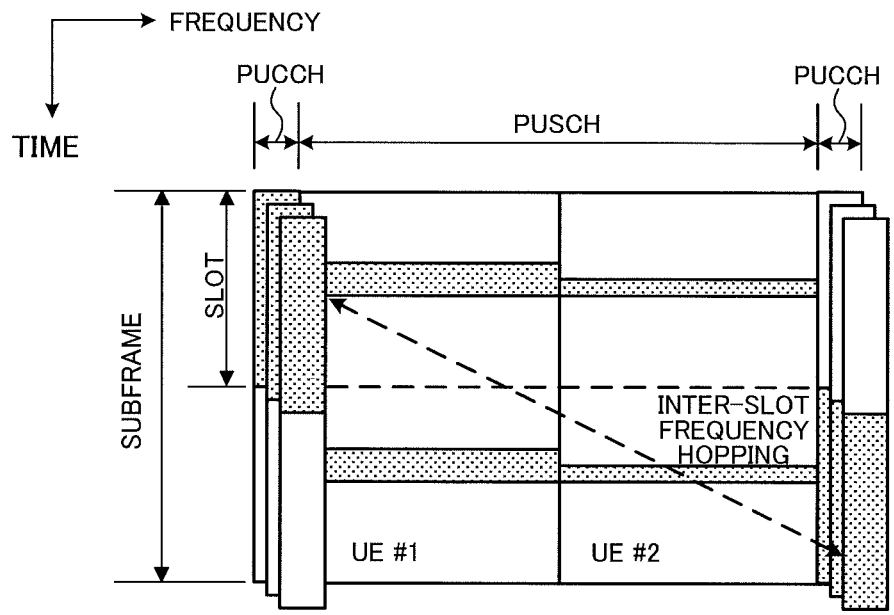
FIG. 4 is a diagram to explain a channel configuration to which an uplink signal is mapped.

As shown in FIG. 4, signals transmitted in uplink are multiplexed into predetermined radio resources, and transmitted from user terminals (UE#1, UE#2) to the radio base station apparatus. The data signals of user terminals are multiplexed into radio resources of the uplink data channel (PUSCH: Physical Uplink Shared Channel) region. Further, in the case of transmitting simultaneously with the data signal, the uplink control signal is multiplexed into radio resource of the PUSCH region together with the data signal, while in the case of transmitting only the uplink control signal, being multiplexed into radio resources of the uplink control channel (PUCCH) region.

The uplink control information transmitted in uplink includes downlink quality information (CQI: Channel Quality Indicator), a retransmission response signal to a downlink data signal, etc. The retransmission response signal is represented by Acknowledgement (ACK) indicating that a transmission signal from the radio base station apparatus to the user terminal is suitably received or Negative Acknowledgement (NACK) indicating that the signal is not suitably received.

The radio base station apparatus detects transmission success of the PDSCH signal by ACK or that an error is detected in the PDSCH signal by NACK. Further, the radio base station apparatus is capable of judging that transmission is DTX (Discontinuous Transmission) when reception power of radio resources allocated to a retransmission response signal is a predetermined value or less in uplink.

DTX is a judgment result that "neither ACK nor NACK was notified from the user terminal", and this means that the user terminal was not able to receive the downlink control channel (PDCCH). In this case, the user terminal does not detect that the PDSCH signal is transmitted to the user terminal, and as a result, transmits neither ACK nor NACK. The radio base station apparatus transmits next new data when ACK is received, while performing retransmission control to retransmit transmitted data in the case of NACK or DTX state with no response.

In the case of transmitting a retransmission response signal using radio resources of the PUCCH, the user terminal selects predetermined radio resources for use in transmission of a retransmission response signal from radio resources, and performs transmission of the PUCCH signal. In addition, used as radio resources of the PUCCH are OCC (Orthogonal Cover Code), CS (Cyclic Shift) and PRB (Physical Resource Block) index.

Further, in LTE (Rel. 8), as shown in FIG. 5, defined are notification formats of ACK/NACK to a downlink data signal (PDSCH signal) (PUCCH Format 1a/1b).

In the case of 1-codeword (1CW) transmission (1 transport block (1 TB)), three states of "ACK", "NACK" and "DTX" are defined (see FIG. 5A), and in the case of 2-codeword (2CW) transmission (2 transport blocks (2 TB)), five states of "ACK, ACK", "ACK, NACK", "NACK, ACK", "NACK, NACK" and "DTX" are defined (see FIG. 5B). In addition, in the following description, "ACK", "NACK" and "DTX" are also described respectively as "A", "N" and "D".

The codeword (CW) indicates a coding unit of channel coding (error correcting coding), and one or multiple codeword transmission is performed in applying MIMO multiplexing transmission. In LTE, Single User MIMO uses maximum 2 codewords. In the case of two-layer transmission, each layer is of an independent codeword, and in the case of 4-layer transmission, 1 codeword is used every two layers.

In the mapping tables of FIG. 5, "0" indicates that the user terminal does not transmit information to the radio base station apparatus in a corresponding subframe, and each of "1", "−1", "j" and "−J" represents a particular phase state. For example, in FIG. 5A, "1" and "−1" respectively correspond to "0" and "1", and are capable of representing information of 1 bit. Further, in FIG. 5B, "1", "−1", "j" and "−J" respectively correspond to data of "00", "1", "10" and "01", and are capable of representing information of 2 bits.

Thus, in the case of applying above-mentioned PUCCH Format 1a/1b, it is possible to transmit retransmission response signals of up to maximum 2 bits using one radio resource. In addition, also in the case of receiving the enhanced PDCCH signal, as in the case of receiving the existing PDCCH signal, the user terminal needs to perform a retransmission check on the PDSCH signal and to control transmission of a retransmission response signal. Described specifically below is feedback control of a retransmission response signal of a PDSCH signal subjected to a retransmission check based on the enhanced PDCCH signal.

(Aspect 1)

Aspect 1 describes the case of including identification information to designate a radio resource for a retransmission response signal in the enhanced PDCCH signal, and selecting a radio resource of a PUCCH. In addition, it is possible to apply Aspect 1 suitably in the case of not performing carrier aggregation.

In Aspect 1, the downlink control information (DCI) transmitted using the enhanced PDCCH region is provided with a bit field of identification information (ARI: ACK/NACK Resource Indicator) to designate a radio resources of a PUCCH for a retransmission response signal. In this case, a particular radio resource is selected based on the ARI included in the enhanced PDCCH signal from a plurality of radio resources beforehand set for each user terminal using a higher-layer signal (higher control signal). By this means, it is possible to allocate radio resources for feedback of retransmission response signals dynamically for each user terminal. In addition, in Aspect 1, it is possible to apply above-mentioned PUCCH Format 1a/1b.

Figures 6A, 6B:
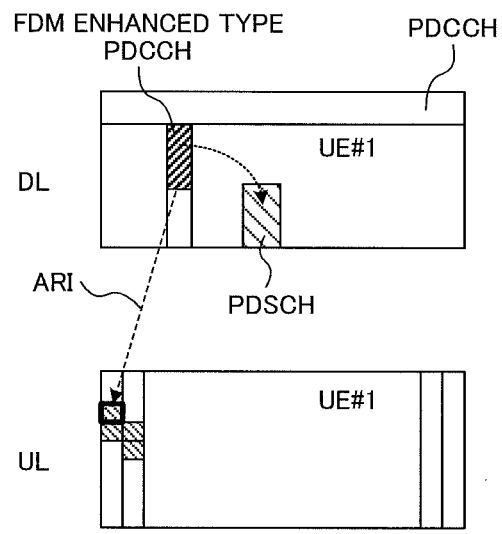
FIG. 6 contains diagrams to explain one example of a radio resource selection method according to an Embodiment.

For example, as shown in FIGS. 6A and 6B, four radio resources (herein, radio resource identifiers R1 to R4) are set on a plurality of user terminals (herein, five UEs (UE#1 to UE#5)). It is possible to notify of a plurality of radio resources set on user terminals by RRC signaling from the higher layer. Then, the radio base station apparatus includes the ARI in the enhanced PDCCH signal to transmit, and each user terminal is thereby capable of selecting a radio resource of a PUCCH used in transmission of a retransmission response signal, based on the ARI included in the enhanced PDCCH signal. In addition, shown herein is the case of sharing a plurality of same radio resources among a plurality of user terminals to allocate, and as a matter of course, different radio resources may be allocated for each user terminal.

Shown herein is the case where 2-bit (four) radio resources are shared and set among UE#1 to UE#5, and radio resources are allocated dynamically to each user terminal, so as to avoid a collision of radio resources between UEs using the 2-bit ARI. The present invention is naturally not limited thereto, the number of radio resources set on users may be higher than 2 bits, and the number of user terminals sharing radio resources is not limited thereto either.

Further, the radio base station apparatus provides the downlink control information (DCI) with an ARI field to designate a radio resource. For example, it is possible to add bits for the ARI field to DL assignment (for example, DCI Format 1A, 2A, etc.) in which downlink scheduling and the like is specified.

Thus, the identification information to designate a radio resource for a retransmission response signal is included in the enhanced PDCCH signal to select a radio resource of an uplink control channel, the higher number of user terminals is thereby capable of sharing one resource, and it is possible to improve usage efficiency of radio resources.

(Aspect 2)

Aspect 2 describes the case of selecting a radio resource of an uplink control channel used in transmission of a retransmission response signal, using a CCE (Control Channel Element) index or VRB (Virtual Resource Block) index associated with the enhanced PDCCH signal. In addition, it is possible to apply Aspect 2 suitably in the case of not performing carrier aggregation.

Figure 7:
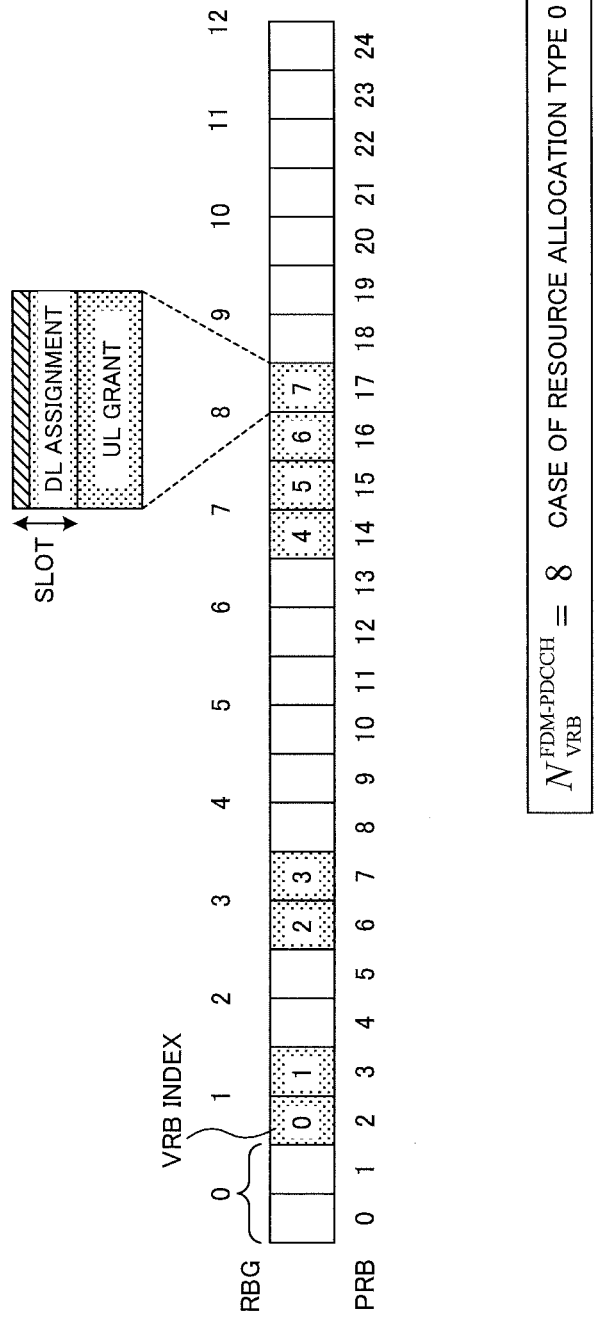
FIG. 7 is a diagram illustrating one example of enhanced PDCCH assignment to a system band.

Described first is one example of assignment of enhanced PDCCH to the system band, with reference to FIG. 7. In addition, FIG. 7 shows the case of setting eight ($N_{VRB}$=8) virtual resource block (VRB) sets as the enhanced PDCCH, for a cell bandwidth comprised of 25 physical resource blocks (PRBs) as one example. Further, FIG. 7 shows the case of Resource allocation type 0. The invention is naturally not limited thereto.

As the Resource block allocation type, there are three different types (Resource allocation types 0, 1 and 2). Resource block allocation types 0 and 1 support non-contiguous frequency allocation in the frequency domain, and type 2 only supports contiguous frequency allocation. Resource block allocation type 0 is to indicate groups of adjacent resource blocks, instead of each resource block in the frequency domain, and thereby reduces the size of bitmap. In FIG. 7, since the cell bandwidth is 25 resource blocks, the size of the resource block group (RBG) is "2". In this case, eight VRB sets are allocated to PRBs (RBG=1, 3, 7 and 8) on a basis of two.

The radio base station apparatus notifies the user terminal of $N_{VRB}$ VRB sets as the enhanced PDCCH, using a higher-layer signal. In the case of setting as shown in FIG. 7, the apparatus notifies the user terminal of predetermined RBGs (herein, RBG=1, 3, 7 and 8). Further, in the VRBs, VRB indexes are numbered sequentially in ascending order of PRB index (RBG index).

Resource blocks of the enhanced PDCCH are capable of being a configuration in which DL assignment (for example, DCI Format 1A, 2A, etc.) is allocated to the first slot, and UL Grant (for example, DCI Format 0, 4) is allocated to the latter slot (second slot). By allocating the DL assignment to the first slot, it is possible to perform demodulation of a downlink data signal promptly. In addition, the configuration of resource blocks of the enhanced PDCCH is not limited thereto.

Further, considered as formats of the enhanced PDCCH are a method (with cross interleaving) for assigning a downlink control signal of each user terminal on a basis of control channel element (CCE) comprised of a plurality of resource element groups (REGs), and another method (without cross interleaving) for assigning a downlink control signal of each user on a basis of PRB.

In the case of with cross interleaving, the user terminal performs blind decoding within a search space specified by a CCE index, while in the case of without cross interleaving, performing blind decoding within a search space specified by a PRB index. Each format will specifically be described below.

<With Cross Interleaving>

In with cross interleaving, the radio base station apparatus assigns a CCE comprised of contiguous REGs (each=4 resource elements) in available radio resources to the enhanced PDCCH. For example, based on the reception quality notified from each user terminal, the radio base station apparatus determines the number of CCEs (aggregation level $\Lambda$ (=1, 2, 4, 8)) to assign contiguously. Then, for the enhanced PDCCH, the apparatus sets REGs associated with the number of CCEs corresponding to the aggregation level of each user terminal.

Figure 8:
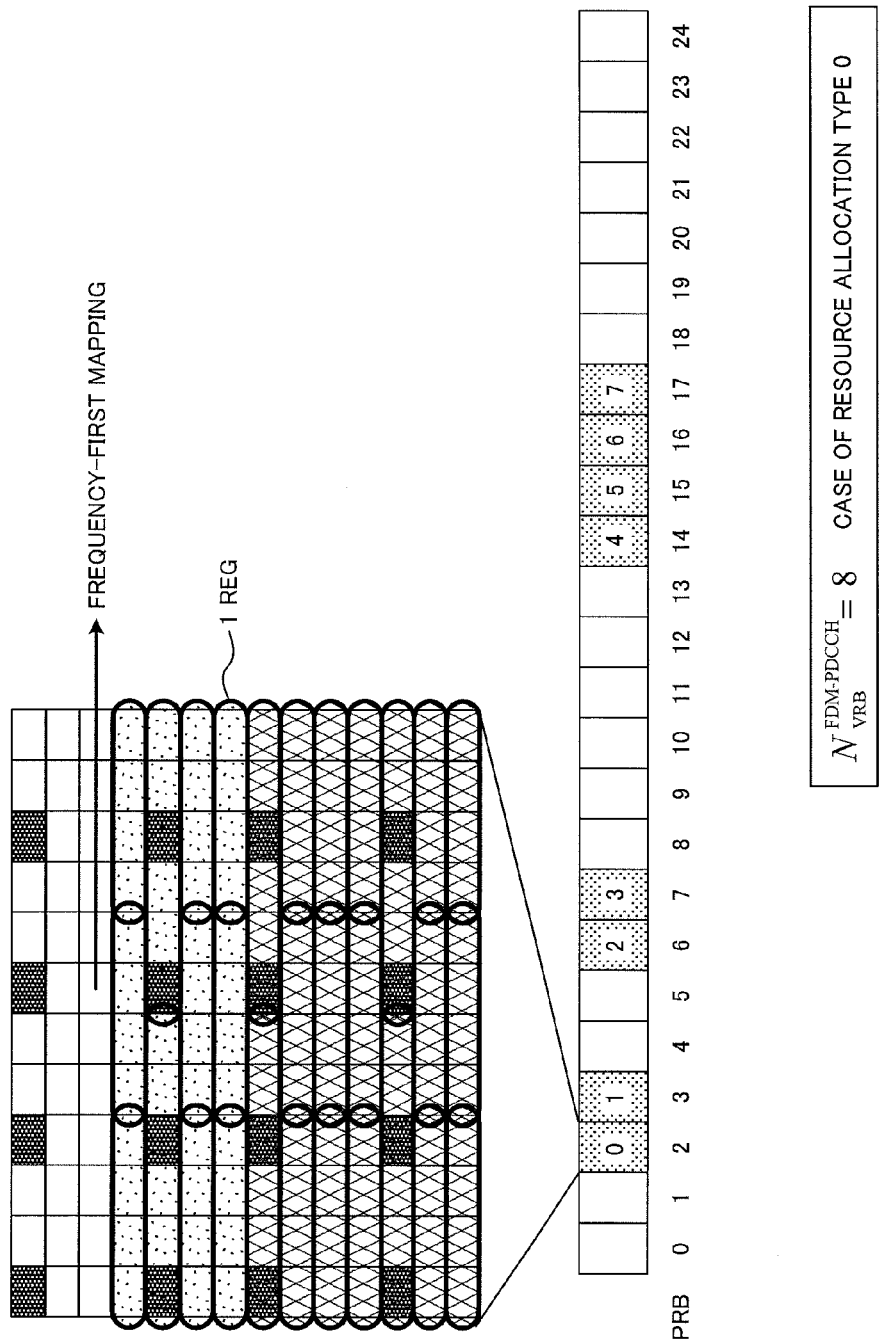
FIG. 8 is a diagram to explain one example of a search space when an enhanced PDCCH format is with cross interleaving.

For example, REGs are allocated to radio resources of a PRB as shown in FIG. 8, in the case of allocating eight ($N_{VRB}$=8) virtual resource block (VRB) sets to the cell bandwidth comprised of 25 PRBs as the enhanced PDCCH in Resource allocation type 0.

Nine REGs constituting one CCE are assigned to radio resources of PRBs constituting the enhanced PDCCH, contiguously in the frequency domain. In FIG. 8, one CCE is comprised of nine REGs (only three REGs are shown in the figure) assigned in the frequency domain of contiguous VRB sets. In other words, one CCE is constituted over different PRBs. In addition, in radio resources of the PRB, assignment of REG is performed except resource elements assigned as a reference signal such as a CRS. Further, the radio base station apparatus assigns contiguous CCEs to the enhanced PDCCH signal of each user terminal, corresponding to the aggregation level of each user terminal.

The user terminal does not know CCEs assigned the enhanced PDCCH signal to the user terminal and the selected aggregation level, and therefore, performs decoding of the enhanced PDCCH signal over all the CCEs having an assignment possibility (blind decoding).

Further, in order to decrease the number of times the user terminal performs blind decoding of the enhanced PDCCH signal, the radio base station apparatus is capable of setting a search space for each user terminal, and assigning CCEs for the enhanced PDCCH signal to each user terminal within the search space for each user terminal. In this case, the user terminal performs blind decoding of the enhanced PDCCH signal within the corresponding search space.

Further, in the case of performing blind decoding within a search space, the user terminal is capable of obtaining a starting position of the search space corresponding to each aggregation level by following equation (1). In addition, the number of candidates for the PDCCH corresponding to each aggregation level $\Lambda$ (=1, 2, 4, 8) can be "6", "6", "2" and "2", respectively.

$$S_n(\Lambda) = \Lambda \cdot \{(Y_n + m) \bmod \lfloor N_{CCE,j}^{FDM-PDCCH}/\Lambda \rfloor\} i$$

$$Y_n = (A \times Y_{n-1}) \bmod D \quad [\text{Eq. 1}]$$

$N_{CCE,j}^{FDM-PDCCH}$: THE TOTAL NUMBER OF CCEs IN SLOT j IN ENHANCED PDCCH
i=0, . . . , $\Lambda$−1,
m=0, . . . , M($\Lambda$)−1,
M($\Lambda$): THE NUMBER OF CANDIDATES FOR PDCCH AT EACH AGGREGATION LEVEL
$Y_{-1} = n_{UEID} \neq 0$
A=39827
D=65537

<Without Cross Interleaving>

In without cross interleaving, the radio base station apparatus assigns a downlink control signal of each user to the enhanced PDCCH on a basis of VRB. For example, based on the reception quality notified from each user terminal, the radio base station apparatus determines the number of VRBs (aggregation level $\Lambda$ (=1, 2, 4, 8)) to assign contiguously. Then, the apparatus assigns the number of VRBs corresponding to the aggregation level of each user terminal as radio resources of the enhanced PDCCH signal of the user terminal.

In without cross interleaving, since a downlink control signal of each user is assigned to the enhanced PDCCH on a basis of VRB, it is possible to perform demodulation of the enhanced PDCCH using a DM-RS (Demodulation-Reference Signal). The DM-RS is defined as a UE-specific reference signal, and enables beamforming to the UE individually, and it is thereby possible to obtain sufficient reception quality. Therefore, it is possible to decrease the aggregation level, being effective at increasing the capacity.

The user terminal does not know VRBs assigned the enhanced PDCCH signal to the user terminal and the selected aggregation level, and therefore, performs decoding of the enhanced PDCCH signal over all the VRBs having an assignment possibility (blind decoding).

Further, in order to decrease the number of times the user terminal performs blind decoding of the enhanced PDCCH, the radio base station apparatus is capable of setting a search space for each user terminal, and assigning VRBs for the enhanced PDCCH signal to each user terminal within the search space for each user terminal. In this case, the user terminal performs blind decoding of the enhanced PDCCH signal within the corresponding search space (see FIG. 9).

Figure 9:
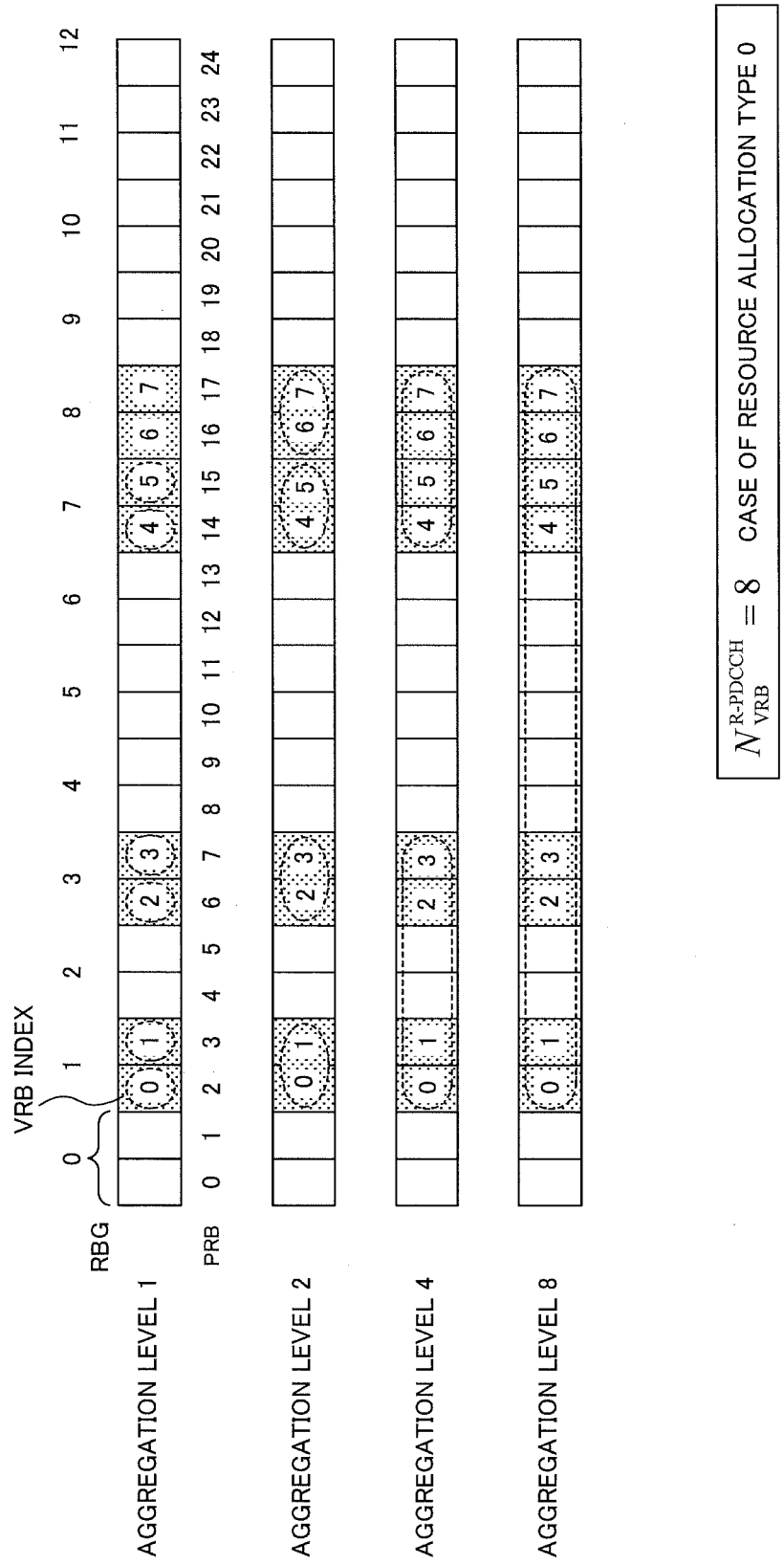
FIG. 9 is a diagram to explain one example of a search space when an enhanced PDCCH format is without cross interleaving.

In the case of performing blind decoding within a search space, the user terminal is capable of obtaining a starting position (VRB index ($n_{VRB}$)) of the search space in the enhanced PDCCH corresponding to each aggregation level by following equation (2). In addition, the number of candidates for the PDCCH corresponding to each aggregation level $\Lambda$ (=1, 2, 4, 8) can be "6", "6", "2" and "2", respectively.

$$n_{VRB}^{FDM-PDCCH} = (\Lambda \cdot m + i) \bmod N_{VRB}^{FDM-PDCCH} \quad [\text{Eq. 2}]$$

i=0, . . . , $\Lambda$−1,
m=0, . . . , M($\Lambda$)−1,
M($\Lambda$): THE NUMBER OF CANDIDATES FOR PDCCH AT EACH AGGREGATION LEVEL
$N_{VRB}^{FDM-PDCCH}$: THE NUMBER OF VRBs SET ON ENHANCED PDCCH For example, as shown in FIG. 9, in aggregation level 1, six search spaces are set on VRB#0 to #5. In aggregation level 2, four search spaces are set on VRB#0 to #7 on a two-VRB basis. In aggregation level 4, two search spaces are set on VRB#0 to #7 on a four-VRB basis. In aggregation level 8, one search space is set on VRB#0 to #7 on an eight-VRB basis. In addition, in aggregation levels 2 and 8, search spaces overlap due to a lack of the number of VRBs.

Then, each user terminal performs blind decoding on the search space corresponding to the aggregation level, and acquires the DCI assigned to the VRB. Thus, in without cross interleaving, the DCI of each user is assigned on a basis of PRB, and blind decoding is performed in the search space specified by the VRB index.

As described above, the user terminal is capable of obtaining the CCE index or VRB index corresponding to the format of the enhanced PUCCH. In Aspect 2, each user terminal selects a radio resource used for a retransmission response signal, using the CCE index or VRB index of the enhanced PDCCH. In addition, also in Aspect 2, it is possible to apply the above-mentioned PUCCH Format 1a/1b.

When the format of the enhanced PDCCH is with cross interleaving, it is possible to determine a radio resource of the PUCCH used in transmission of a retransmission response signal, based on the CCE index associated with the enhanced PDCCH signal of the user terminal. In addition, when the aggregation level is higher than "1", it is possible to select the lowest CCE index among a plurality of corresponding CCE indexes.

More specifically, as shown in following equation (3), the user terminal is capable of obtaining a radio resource of the PUCCH from a parameter set by RRC signaling from the higher layer and the number (CCE index) of the control channel element of the enhanced PDCCH.

$$n_{PUCCH}^{(1,p)} = n_{CCE}^{lowest} + N_{PUCCH}^{(1)} \quad [\text{Eq. 3}]$$

$n_{CCE}^{lowest}$: LOWEST CCE INDEX ASSOCIATED WITH ENHANCED PDCCH
$N_{PUCCH}^{(1)}$: PARAMETER
p: ANTENNA PORT In addition, used as radio resources of the PUCCH are OCC (Orthogonal Cover Code), CS (Cyclic Shift) and PRB (Physical Resource Block) index. The user terminal multiplexes a retransmission response signal into a radio resource selected based on the CCE index to transmit to the radio base station apparatus as feedback.

When the format of the enhanced PDCCH is without cross interleaving, since the CCE index corresponding to the enhanced PDCCH signal does not exist as described above, the user terminal is capable of determining a radio resource of the PUCCH used in transmission of a retransmission response signal, based on the VRB index. In addition, when the aggregation level is higher than "1", it is possible to select the lowest VRB index among corresponding VRB indexes.

More specifically, as shown in following equation (4), the user terminal is capable of obtaining a radio resource of the PUCCH from a parameter set by RRC signaling from the higher layer and the virtual resource block number (VRB index) of the enhanced PDCCH.

$$n_{PUCCH}^{(1,p)} = n_{VRB}^{lowest} + N_{PUCCH}^{(1)} \quad [\text{Eq. 4}]$$

$n_{VRB}^{lowest}$: LOWEST VRB INDEX ASSOCIATED WITH ENHANCED PDCCH
$N_{PUCCH}^{(1)}$: PARAMETER
p: ANTENNA PORT Thus, the user terminal receiving the enhanced PUCCH signal selects a radio resource of the PUCCH to transmit a retransmission response signal based on the CCE index or VRB index, and it is thereby possible to omit signaling for the radio base station to notify the user terminal of a radio resource used in a corresponding retransmission response signal. By this means, it is made possible to use radio resources of downlink transmission efficiently.

(Aspect 3)

Aspect 3 describes the case of applying channel selection in a system comprised of a plurality of base frequency blocks. In addition, it is possible to apply Aspect 3 suitably in the case of performing carrier aggregation.

As described above, in LTE-A systems (Rel. 10), for the purpose of further improving spectral efficiency, peak throughput and the like, studied is assignment of frequencies with a wider band than in LTE. For example, in LTE-A, it is one of requirements having backward compatibility with LTE, and it is studied adopting a transmission band having a plurality of base frequency blocks (component carriers (CCs)) each having a bandwidth usable in LTE.

Further, in LTE-A systems, in order to maintain characteristics of uplink single carrier transmission, it is studied transmitting retransmission response signals to PDSCH signals transmitted in a plurality of downlink CCs on a PUCCH of a particular CC. More specifically, it is studied setting a plurality of radio resources on PUCCH Format 1a/1b and adopting mapping tables that define bit information by phase modulation (for example, QPSK data modulation) and combinations of retransmission response signals of a plurality of CCs by selection information of radio resources (Channel selection).

In addition, a particular CC used in transmission of retransmission response signals to PDSCH signals transmitted in a plurality of downlink CCs is called the PCC (Primary Component Carrier), and a CC except the PCC is called the SCC (Secondary Component Carrier). Further, a serving cell in the PCC is called PCell (Primary Cell), and a serving cell in the SCC is called SCell (Secondary Cell).

FIG. 10 shows one example of mapping tables in the case of applying Channel selection in a system band comprised of two base frequency blocks (PCC and SCC). The mapping tables are determined by the number of CCs and transmission mode (i.e. the number of transport blocks or the number of codewords) assigned by RRC signaling from the higher layer.

FIG. 10A shows the case of setting three radio resources (Ch1 to Ch3) on PUCCH Format 1b (one of PCC and SCC is 1CW, and the other one is 2CW). FIG. 10B shows the case of setting four radio resources (Ch1 to Ch4) on PUCCH Format 1b (one of PCC and SCC are 2CW). In FIG. 10A, ACK(0) and ACK(1) correspond to retransmission response signals of the PCC (2CW), while ACK(2) corresponds to a retransmission response signal of the SCC (1CW), or ACK (0) corresponds to a retransmission response signal of the PCC (1CW), while ACK(1) and ACK(2) correspond to retransmission response signals of the SCC (2CW). Further, in FIG. 10B, ACK(0) and ACK (1) correspond to retransmission response signals of the PCC (2CW), while ACK(2) and ACK(3) correspond to retransmission response signals of the SCC (2CW).

As radio resources (for example, Ch1 to Ch4) of the PUCCH set in the mapping table, it is possible to use OCC (Orthogonal Cover Code), CS (Cyclic Shift) and PRB (Physical Resource Block) index.

In Aspect 3, the user terminal performs a retransmission check of a downlink data signal (PDSCH signal) based on the enhanced PDCCH signal for each of a plurality of CCs, and determines a radio resource of the PUCCH used in transmission of a retransmission response signal, from a result (combination of ACK/NACK/DTX) of retransmission checks in each CC and the mapping table.

For example, in the case that the PCC and SCC are 2CW, retransmission response signals (ACK(0) and ACK(1)) of the PCC (2CW) are "NACK, ACK", and that retransmission response signals (ACK(2) and ACK(3)) of the SCC (2CW) are "ACK, ACK", referring to the mapping table as shown in FIG. 10B, the user terminal uses "-j" of a QPSK modulation symbol in the radio resource (Ch2).

Thus, by applying Channel selection, even in the case of transmitting retransmission response signals of PDSCH signals of a plurality of CCs on a PUCCH of a particular CC, it is possible to suitably set retransmission response signals of a plurality of CCs to transmit. Meanwhile, in the case of determining a radio resource of the PUCCH while applying above-mentioned Channel selection, it is necessary to designate a plurality of radio resources (for example, Ch1 to Ch4) of the PUCCH set in the mapping table.

Figure 11:
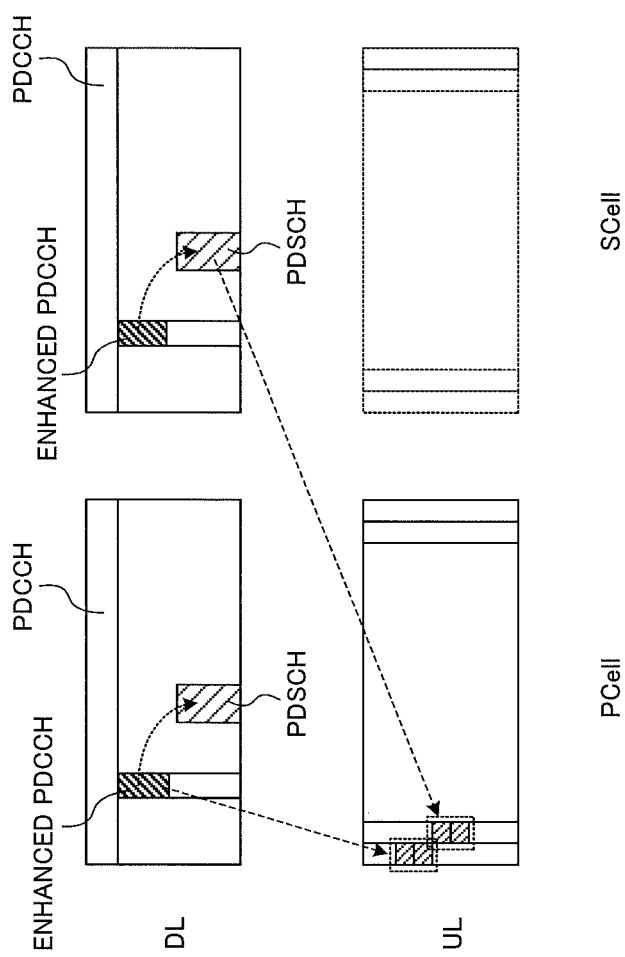
FIG. 11 is a diagram to explain one example of the radio resource selection method according to the Embodiment.

In Aspect 3, in application of Channel selection, a plurality of radio resources of the PUCCH set in the mapping table is designated using the enhanced PDCCH signal (see FIG. 11). More specifically, radio resources (Ch1 to Ch4) in the mapping table are designated, based on at least one of the CCE index (or VRB index) associated with the enhanced PDCCH signal, and the ARI to designate a radio resource of the PUCCH included in the enhanced PDCCH signal.

For example, when the enhanced PDCCH signal is transmitted in the PCell, in the case where the format of the enhanced PDCCH is with cross interleaving, it is possible to designate a radio resource of the mapping table based on the CCE index associated with the enhanced PDCCH signal of the user terminal. For example, when the PCell is 2CW, at least one of Ch1 and Ch2 in the mapping table is designated based on the CCE index associated with the enhanced PDCCH signal of the user terminal.

To designate both Ch1 and Ch2 based on the CCE index, it is possible to obtain from a parameter set by RRC signaling from the higher layer and the CCE index associated with the enhanced PDCCH signal, using following equations (5) and (6). In addition, in the following equations, equation (5) corresponds to Ch1, and equation (6) corresponds to Ch2. Further, when the aggregation level is higher than "1", it is possible to select the lowest CCE index among a plurality of corresponding CCE indexes.

$$n_{PUCCH,1}^{(1,p)} = n_{CCE}^{lowest} + N_{PUCCH}^{(1)} \quad [\text{Eq. 5}]$$

$$n_{PUCCH,2}^{(1,p)} = n_{CCE}^{lowest} + 1 + N_{PUCCH}^{(1)} \quad [\text{Eq. 6}]$$

$n_{CCE}^{lowest}$: LOWEST CCE INDEX ASSOCIATED WITH ENHANCED PDCCH
$N_{PUCCH}^{(1)}$: PARAMETER
p: ANTENNA PORT Further, when the format of the enhanced PDCCH is without cross interleaving, radio resources in the mapping table are designated based on the VRB index associated with the enhanced PDCCH signal of the user terminal. For example, when the PCell is 2CW, at least one of Ch1 and Ch2 in the mapping table is designated based on the VRB index associated with the enhanced PDCCH signal of the user terminal.

To designate both Ch1 and Ch2 based on the VRB index, it is possible to obtain radio resources from a parameter set by RRC signaling from the higher layer and the CCE index associated with the enhanced PDCCH signal, using following equations (7) and (8). In addition, in the following equations, equation (7) corresponds to Ch1, and equation (8) corresponds to Ch2. Further, when the aggregation level is higher than "1", it is possible to select the lowest VRB index among a plurality of corresponding VRB indexes.

$$n_{PUCCH,1}^{(1,p)} = n_{VRB}^{lowest} + N_{PUCCH}^{(1)} \quad [\text{Eq. 7}]$$

$$n_{PUCCH,2}^{(1,p)} = n_{VRB}^{lowest} + 1 + N_{PUCCH}^{(1)} \quad [\text{Eq. 8}]$$

$n_{VRB}^{lowest}$: LOWEST VRB INDEX ASSOCIATED WITH ENHANCED PDCCH
$N_{PUCCH}^{(1)}$: PARAMETER
p: ANTENNA PORT In addition, when the PCell is 1CW, it is possible to designate radio resources set on Ch1 using above-mentioned equation (5) or equation (7). Further, also when the PCell is 2CW, one of radio resources (for example, Ch1) may be designated using the CCE index or VRB index, while the other radio resource (for example, Ch2) may be designated by RRC signaling from the higher layer.

Thus, by designating radio resources of the mapping table based on the CCE index or VRB index associated with the enhanced PUCCH signal, it is possible to omit signaling for the radio base station to notify the user terminal of a radio resource used in a corresponding retransmission response signal. By this means, it is made possible to use radio resources of downlink transmission efficiently.

Moreover, both radio resources of Ch1 and Ch2 may be designated by RRC signaling from the higher layer. In the case of designating radio resources by the higher layer, radio resources are shared among a plurality of user terminals to set, and it is possible to select a particular radio resource using the ARI included in the enhanced PDCCH signal. Thus, by combining the CCE index (or VRB index) of the enhanced PDCCH and the ARI to designate radio resources, it is possible to use radio resources efficiently, and to flexibly set the method of designating a radio resource of the PUCCH.

Further, when the enhanced PDCCH signal is transmitted in the SCell, for radio resources of Ch3 and Ch4 in the mapping table, it is possible to designate a plurality of resources by the higher layer, and to select a particular radio resource using the ARI included in the enhanced PDCCH signal.

When enhanced PDCCH signals are transmitted in the same subframe in the PCell and SCell, there is a case that the CCE index (or VRB index) of the enhanced PDCCH signal of the PCell and the CCE index (or VRB index) of the enhanced PDCCH signal of the SCell overlap each other. Accordingly, in the case of designating radio resources (for example, Ch1, Ch2) based on the CCE index (or VRB index) of the enhanced PDCCH signal of one of CCs, for the other CC, it is preferable to select a particular radio resource using the ARI included in the enhanced PDCCH signal.

When the PCC and SCC are 2CW, FIG. 12 illustrates the case of designating Ch1 based on the CCE index of the enhanced PDCCH signal of the PCell, while selecting particular radio resources using the ARI included in the enhanced PDCCH signal for Ch2 to Ch4.

The radio base station apparatus notifies the user terminal of four combinations (corresponding to 2 bits) of radio resources of 3 sets (Ch2 to Ch4) (see FIG. 12B). As a matter of course, the same radio resources may be included in different sets. It is possible to notify of combinations of radio resources by RRC signaling from the higher layer. Then, the radio base station apparatus includes the ARI in the enhanced PDCCH signal to transmit, and by this means, the user terminal selects radio resources (Ch2 to Ch4) to set in the mapping table. In this case, it is possible to substitute the ARI field for the TPC command field (2 bits) in the enhanced PDCCH signal in the SCell to provide.

Further, for radio resources corresponding to Ch1, the user terminal designates from the CCE index associated with the enhanced PDCCH signal of the PCell using above-mentioned equation (5). In addition, when the format of the enhanced PDCCH signal is without cross interleaving, the user terminal designates radio resources corresponding to Ch1 using above-mentioned equation (7), from the VRB index associated with the enhanced PDCCH signal of the PCell. By this means, it is possible to designate radio resources corresponding to Ch1 to Ch4 of the mapping table (see FIG. 12A).

Figure 13:
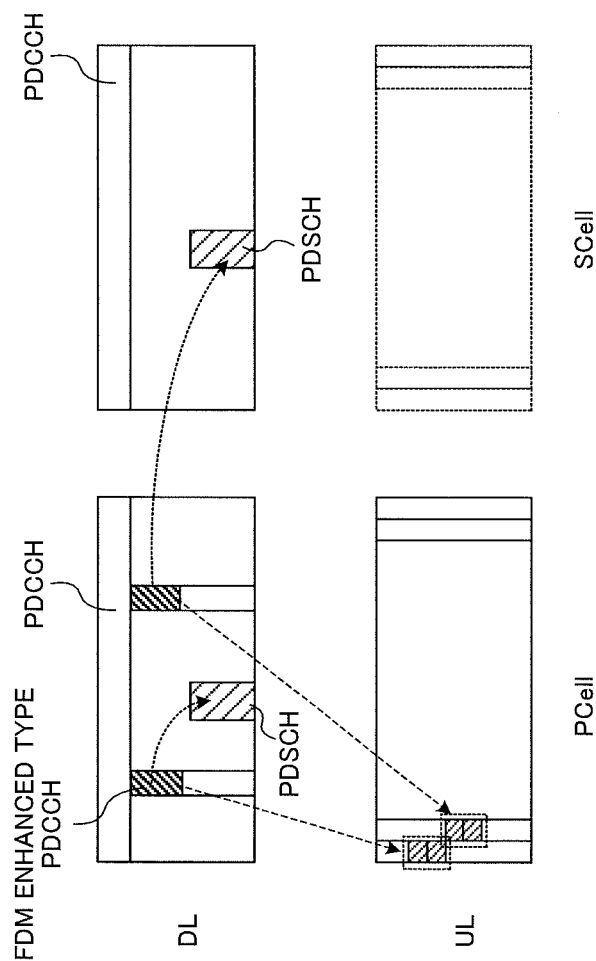
FIG. 13 is another diagram to explain one example of the radio resource selection method according to the Embodiment.

In addition, FIG. 11 as described above illustrates the case where the enhanced PDCCH signal is multiplexed into the band of each of CCs (PCell and SCell), but this Embodiment is not limited thereto. Moreover, as shown in FIG. 13, Aspect 3 is applicable to the case (cross carrier scheduling) of transmitting enhanced PDCCH signals used in a plurality of serving cells from a serving cell (for example, PCell) of one CC (for example, PCC).

Also in cross carrier scheduling, it is possible to select radio resources of the PUCCH by applying Channel selection using the above-mentioned mapping tables. In addition, in the case of cross carrier scheduling, as shown in FIG. 13, since the enhanced PDCCH signal of each CC is multiplexed into a particular CC (herein, PCC), the CCE index (or VRB index) associated with the enhanced PDCCH signal of each CC do not overlap one another.

Accordingly, in the case of applying cross carrier scheduling, it is possible to designate radio resources (for example, Ch1 to Ch4), based on CCE indexes (or VRB indexes) of enhanced PDCCH signals of both CCs.

For example, when the PCC and SCC are 2CW, it is possible to designate Ch1 and Ch2 using above-mentioned equations (5) and (6) (or equations (7) and (8)), from the CCE index (or VRB index) associated with the enhanced PDCCH signal of the PCell. Further, it is possible to designate Ch3 and Ch4 using above-mentioned equations (5) and (6) (or equations (7) and (8)), from the CCE index (or VRB index) associated with the enhanced PDCCH signal of the SCell. As a matter of course, for a part of radio resources, the method may be combined for selecting radio resources using the ARI included in the enhanced PDCCH signal.

(Aspect 4)

Aspect 4 describes the case of including identification information for designating radio resources for retransmission response signals in the enhanced PDCCH signal and selecting radio resources of the PUCCH in a system comprised of a plurality of base frequency blocks. In addition, it is possible to apply Aspect 3 suitably in the case of performing carrier aggregation.

Figure 14:
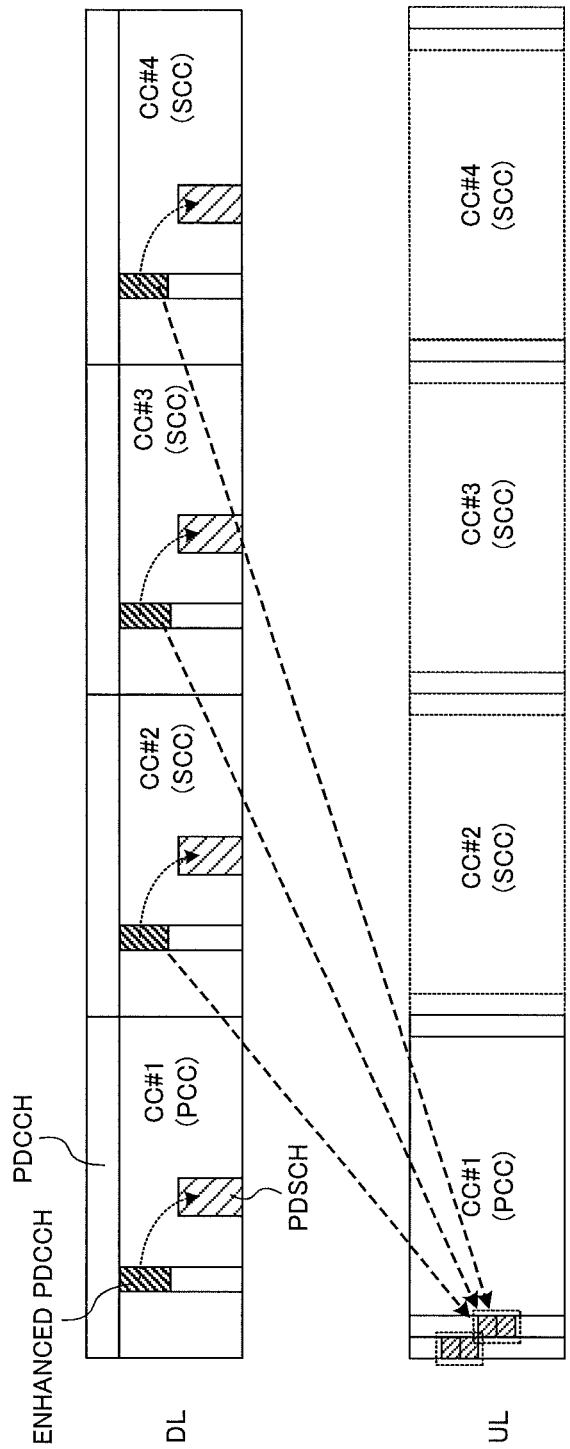
FIG. 14 is still another diagram to explain one example of the radio resource selection method according to the Embodiment.

A method of allocating radio resources of retransmission response signals in Aspect 4 will be described with reference to FIG. 14. In addition, FIG. 14 illustrates the case where a transmission band is comprised of four CCs (CC#1 to CC#2). Further, FIG. 14 illustrates the case where CC#1 constitutes a particular base frequency block (PCC) to transmit a PUCCH signal, and CC#2 to CC#4 constitute the other base frequency blocks (SCCs). In addition, in Aspect 4, it is possible to apply PUCCH Format 3.

First, the radio base station apparatus sets a plurality (for example, 4) of radio resources for PUCCH signals on each user terminal by RRC signaling from the higher layer. Further, in the enhanced PDCCH signal for the PDSCH signal of the SCC, the TPC field (2 bits) is replaced with the ARI field.

In the ARI field, a single radio resource for the user terminal to use is designated among a plurality of radio resources allocated by RRC signaling. The user terminal specifies the radio resource designated by the ARI field from among a plurality of radio resources allocated by RRC signaling, and is thereby capable of obtaining the radio resource for the retransmission response signal.

Further, in the ARI field, it is preferable to designate the same radio resource in all of a plurality of SCCs (in FIG. 14, CC#2 to CC#4). By this means, the user terminal is capable of specifying the single radio resource allocated to the user terminal. The retransmission response signals in response to all CCs are multiplexed into thus specified radio resource, and it is thereby possible to notify the radio base station apparatus that the PDSCH signal is suitably received or the PDSCH signal is not suitably received.

As described above, the radio base station apparatus is capable of using the TPC field (2 bits) in DCI Format 1A of the SCC for notification of the ARI. As a matter of course, the ARI field may be added to another DCI Format, or the number of radio resources to set may be made higher than 2 bits.

Further, FIG. 14 illustrates the configuration for transmitting enhanced PDCCH signals in all CCs, but this Embodiment is not limited thereto. It is also possible to apply to the case where enhanced PDCCH signals are transmitted in a part of CCs, and existing PDCCH signals (multiplexed into 1 to 3 OFDM symbols from the beginning of a subframe) are transmitted in the other CCs.

Figure 15:
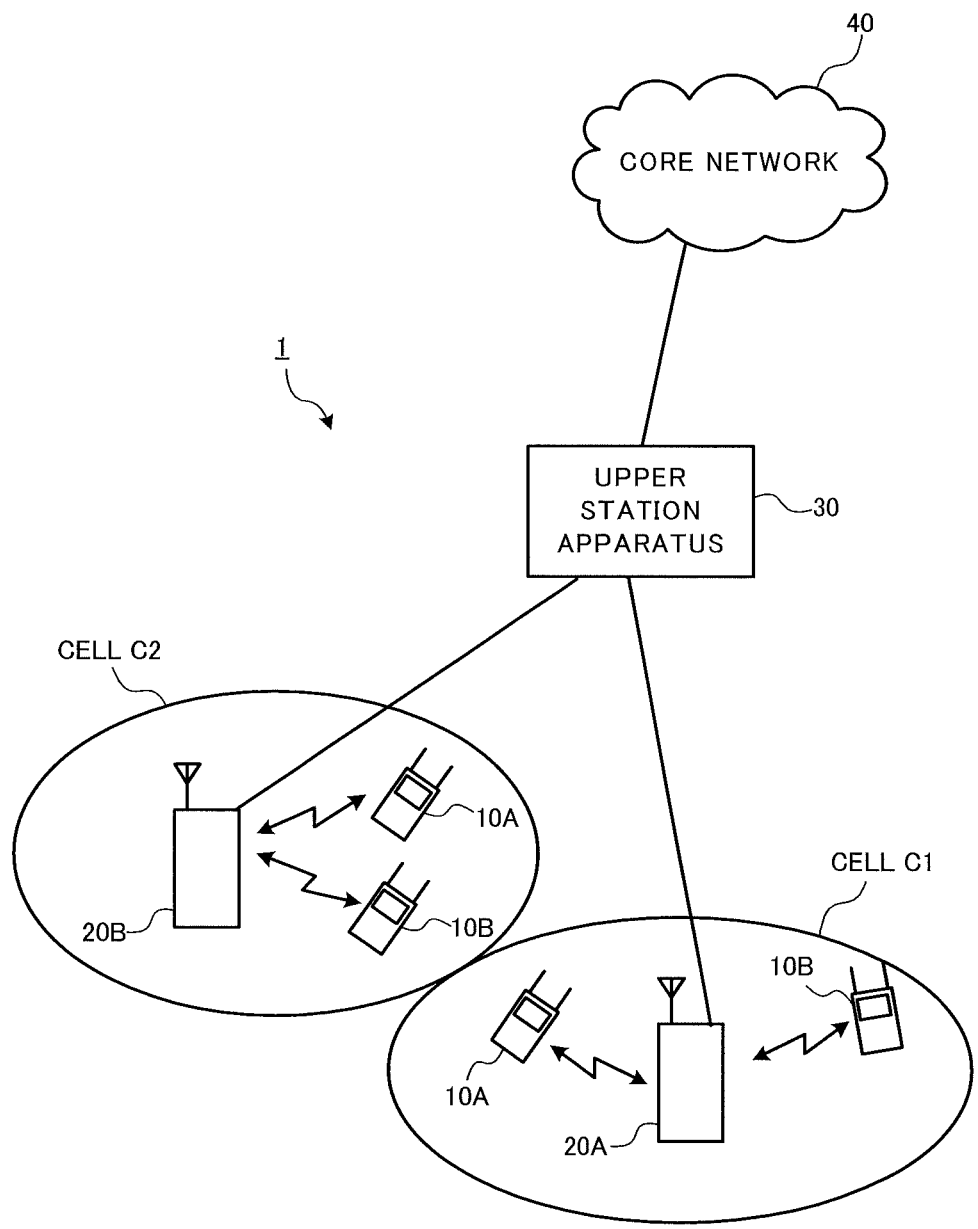
FIG. 15 is an explanatory view of a system configuration of a radio communication system according to the Embodiment.

Referring to FIG. 15, described below is a mobile communication system 1 having user terminals 10 and radio base station apparatuses 20 according to the Embodiment of the invention. The user terminals 10 and radio base station apparatuses 20 support LTE-A.

As shown in FIG. 15, the radio communication system 1 includes the radio base station apparatuses 20, and a plurality of user terminals 10 and is comprised thereof. The radio base station apparatuses 20 are connected to an upper station apparatus 30, and the upper station apparatus 30 is connected to a core network 40. Further, the radio base station apparatuses 20 are mutually connected by wired connection or wireless connection. Each user terminal 10 is capable of communicating with the radio base station apparatuses 20 in cells C1 and C2. In addition, for example, the upper station apparatus 30 includes an access gateway apparatus, radio network controller (RNC), mobility management entity (MME), etc., but is not limited thereto.

Each user terminal 10 includes an LTE terminal and LTE-A terminal, and is described as a user terminal unless otherwise specified in the following description. Further, for convenience in description, the description is given while assuming that equipment that performs radio communications with the radio base station apparatus 20 is each user terminal 10, and more generally, the equipment may be user equipment including mobile terminal apparatuses and fixed terminal apparatuses.

In the radio communication system 1, as a radio access scheme, OFDMA (Orthogonal Frequency Division Multiple Access) is applied in downlink, while SC-FDMA (Single-Carrier Frequency Division Multiple Access) is applied in uplink. In addition, the uplink radio access scheme is not limited thereto. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Herein, described is the communication channel configuration defined in LTE-A. Downlink communication channels have the PDSCH shared among user terminals 10, downlink L1/L2 control channels (PDCCH, PCFICH, PHICH), and enhanced PDCCH. User data and higher control signals are transmitted on the PDSCH. Herein, downlink control signals are multiplexed into radio resources from the starting OFDM symbol to the predetermined number of OFDM symbols (the number of OFDM symbols being "1" to "3") in a subframe, and enhanced PDCCH signals and PDSCH signals are frequency-division multiplexed into radio resources after the predetermined number of OFDM symbols.

Scheduling information of PDSCH and PUSCH and the like is transmitted on the enhanced PDCCH. The enhanced PDCCH is used to support a lack of capacity of the PDCCH using the resource region assigned the PDSCH. The higher control signal is capable of including information (for example, information of RGB) on the PRB position in which the enhanced PDCCH is set, information on a parameter used in a control equation for determining a starting position of a search space, information on a plurality of radio resources to be candidates in the case of selecting a radio resource using the ARI, and the like.

Uplink control channels have the PUSCH shared among user terminals 10, and PUCCH that is an uplink control channel. User data is transmitted on the PUSCH. Downlink radio quality information (CQI: Channel Quality Indicator), retransmission response signal (ACK/NACK signal) and the like is transmitted on the PUCCH.

Figure 16:
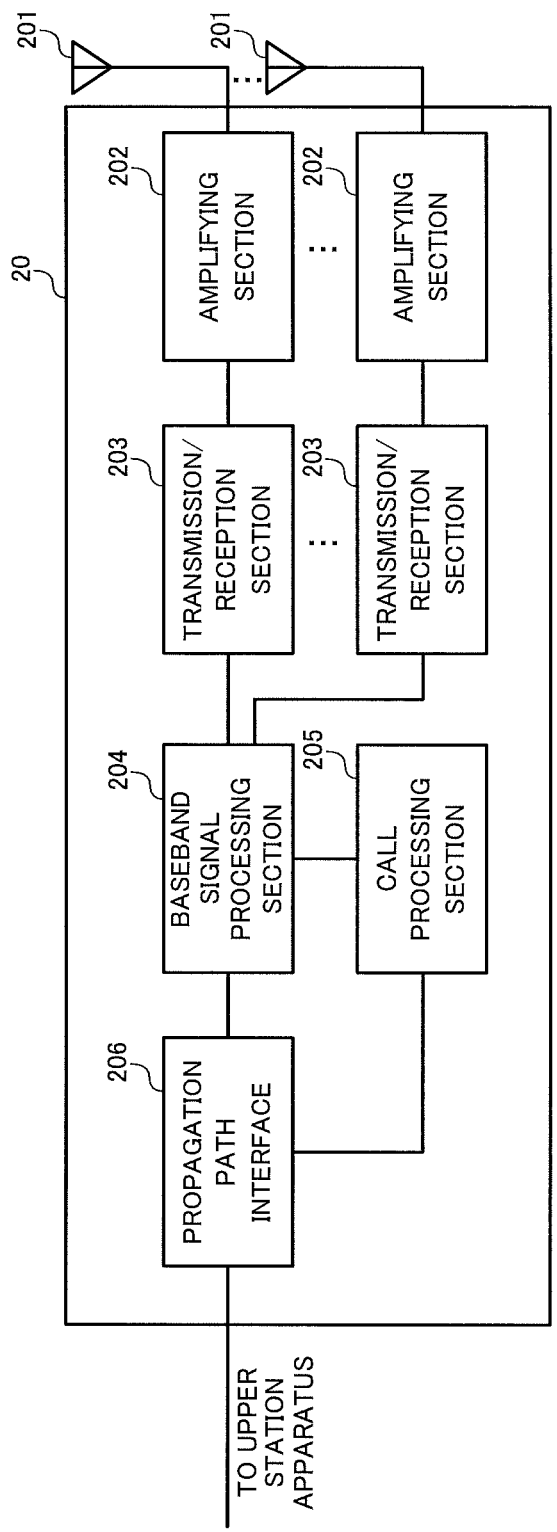
FIG. 16 is an explanatory view of an entire configuration of a radio base station apparatus according to the Embodiment.

Referring to FIG. 16, described is the entire configuration of the radio base station apparatus 20 according to this Embodiment. The radio base station apparatus 20 is provided with a plurality of transmission/reception antennas 201 for MIMO transmission, amplifying sections 202, transmission/reception sections 203, baseband signal processing section 204, call processing section 205 and transmission path interface 206.

The user data to transmit from the radio base station apparatus 20 to the user terminal 10 is input to the baseband signal processing section 204 via the transmission path interface 206 from the upper station apparatus 30 of the radio base station apparatus 20. The baseband signal processing section 204 performs PDCP layer processing, segmentation and concatenation of the user data, RLC (Radio Link Control) layer transmission processing such as transmission processing of RLC retransmission control, MAC (Medium Access Control) retransmission control e.g. HARQ transmission processing, scheduling, transmission format selection, channel coding, Inverse Fast Fourier Transform (IFFT) processing and precoding processing.

Further, the baseband signal processing section 204 notifies the user terminal 10 of control information for radio communications in the cell on the broadcast channel. For example, the control information for communications in the cell includes the system bandwidth in uplink or downlink, identification information (Root Sequence Index) of a root sequence to generate a signal of a random access preamble on the PRACH, etc.

Each transmission/reception section 203 converts the frequency of the baseband signal, which is subjected to precoding for each antenna and is output from the baseband signal processing section 204, into a radio frequency band. The amplifying section 202 amplifies the frequency-converted radio frequency signal, and the signal is transmitted from the transmission/reception antenna 201. Meanwhile, with respect to data transmitted from the user terminal 10 to the radio base station apparatus 20 in uplink, a radio frequency signal received in each transmission/reception antenna 201 is amplified in the respective amplifying section 202, subjected to frequency conversion to be converted into a baseband signal in each transmission/reception section 203, and is input to the baseband signal processing section 204.

The baseband signal processing section 204 performs FFT processing, IDFT processing, error correcting decoding, reception processing of MAC retransmission control, and reception processing of RLC layer and PDCP layer on the user data included in the input baseband signal to transfer to the upper station apparatus 30 via the transmission path interface 206. The call processing section 205 performs call processing such as setting and release of the communication channel, status management of the radio base station apparatus 20, and management of radio resources.

Figure 17:
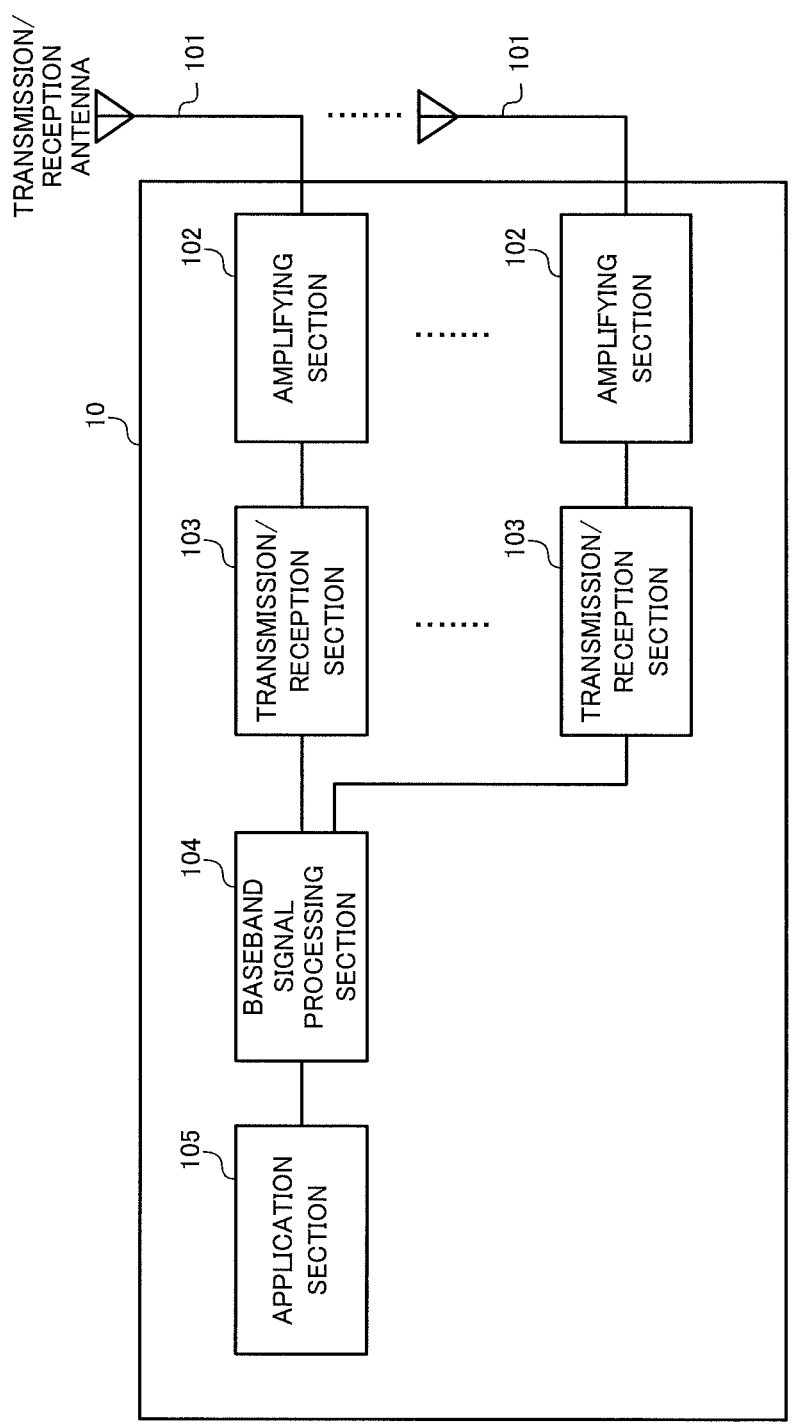
FIG. 17 is an explanatory view of an entire configuration of a user terminal according to the Embodiment.

Referring to FIG. 17, described next is the entire configuration of the user terminal 10 according to this Embodiment. The LTE terminal and the LTE-A terminal have the same configuration of principal part of hardware, and are not distinguished to describe. The user terminal 10 is provided with a plurality of transmission/reception antennas 101 for MIMO transmission, amplifying sections 102, transmission/reception sections 103, baseband signal processing section 104 and application section 105.

With respect to data in downlink, radio frequency signals received in a plurality of transmission/reception antennas 101 are respectively amplified in the amplifying sections 102, and are subjected to frequency conversion to be converted into baseband signals in the transmission/reception sections 103. The baseband signals are subjected to FFT processing, error correcting decoding, reception processing of retransmission control, etc. in the baseband signal processing section 104. Among the data in downlink, the user data in downlink is transferred to the application section 105. The application section 105 performs processing concerning layers higher than the physical layer and MAC layer and the like. Further, among the data in downlink, the broadcast information is also transferred to the application section 105.

Meanwhile, with respect to user data in uplink, the application section 105 inputs the data to the baseband signal processing section 104. The baseband signal processing section 104 performs transmission processing of retransmission control (H-ARQ (Hybrid ARQ)), channel coding, precoding, DFT processing, IFFT processing and the like on the data to transfer to each transmission/reception section 103. In other words, the baseband signal processing section 104 includes are transmission check section that performs a retransmission check on the PDSCH signal based on the enhanced PDCCH signal to output a retransmission response signal, and a selection that selects a radio resource of a PUCCH used in transmission of the retransmission response signal based on the enhanced PDCCH signal.

The transmission/reception section 103 converts the frequency of the baseband signal output from the baseband signal processing section 104 into a radio frequency band. Then, the amplifying section 102 amplifies the frequency-converted radio frequency signal, and the signal is transmitted from the transmission/reception antenna 101.

Figure 18:
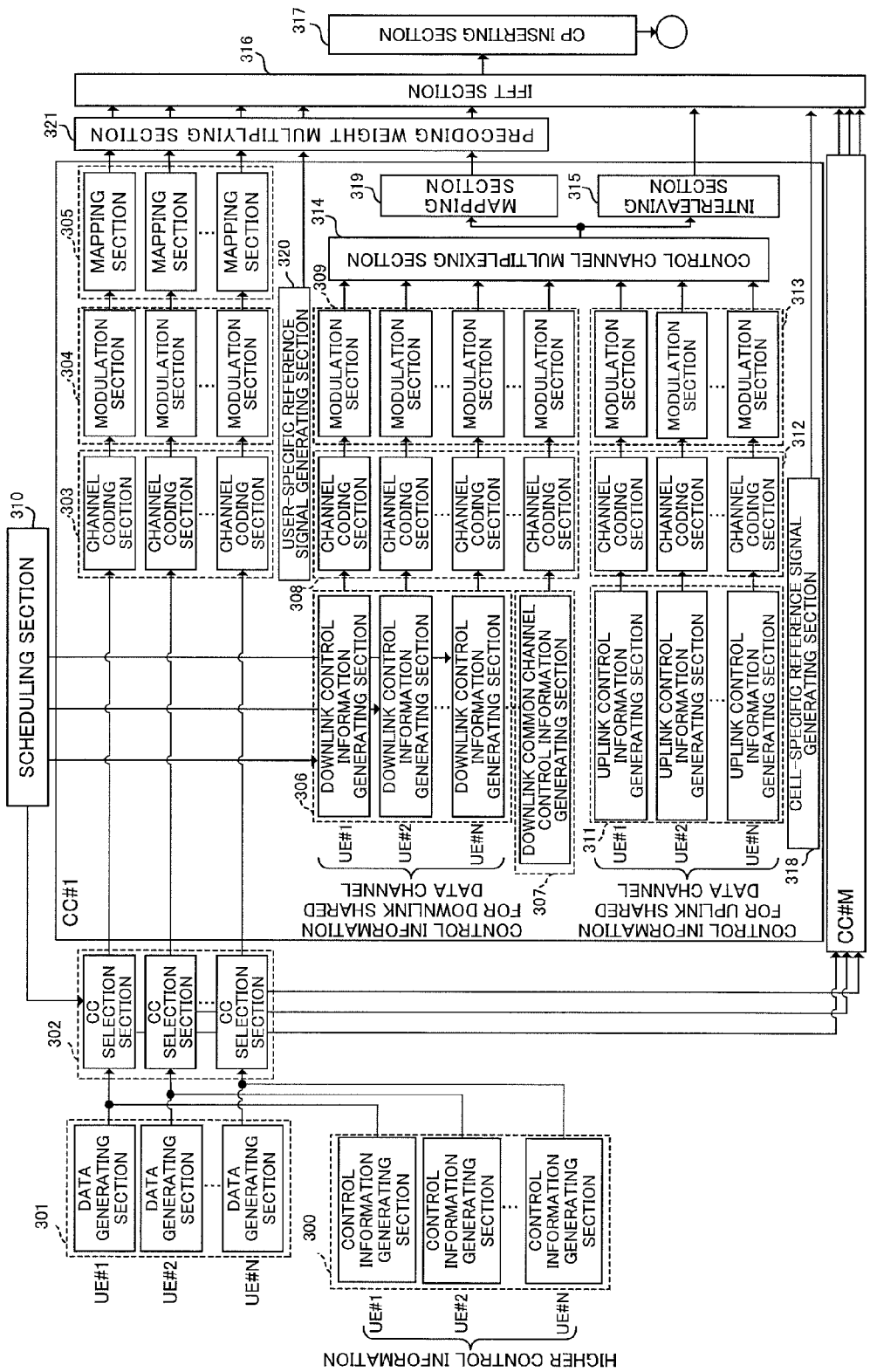
FIG. 18 is a functional block diagram illustrating a baseband processing section of the radio base station apparatus and a part of hither layer according to the Embodiment.

FIG. 18 is a functional block diagram of the baseband signal processing section 204 that the radio base station apparatus 20 has and a part of the higher layer according to this Embodiment, and mainly shows functional blocks of transmission processing in the baseband signal processing section 204. FIG. 18 illustrates a base station configuration capable of supporting maximum M (CC #1 to CC #M) component carriers. Transmission data to user terminals 10 under control of the radio base station apparatus 20 is transferred from the upper station apparatus 30 to the radio base station apparatus 20.

A control information generating section 300 generates higher control information undergoing higher layer signaling (for example, RRC signaling) on a user-by-user basis. Further, the higher control information is capable of including a resource block (PRB position) to which the enhanced PDCCH (FDM type PDCCH) is capable of being mapped beforehand. Furthermore, when necessary, the section 300 generates information on a parameter used in a control equation to determine a starting position of a search space, information on a plurality of radio resources to be candidates in the case of selecting a radio resource using the ARI, and the like.

A data generating section 301 outputs transmission data transferred from the upper station apparatus 30 as user data for each user. A component carrier selecting section 302 selects a component carrier used in radio communications with the user terminal 10 for each user. The radio base station apparatus 20 notifies the user terminal of addition/deletion of component carriers by RRC signaling, and receives an application completion message from the user terminal 10.

A scheduling section 310 controls assignment of component carriers to user terminals 10 under control of the radio base station apparatus corresponding to communication quality of the entire system band. Further, a particular component carrier (PCC) is determined from among component carriers selected for each user terminal. Moreover, the scheduling section 310 controls allocation of resources in each of component carriers CC#1 to CC#M. The section 310 distinguishes between an LTE terminal user and an LTE-A terminal user to perform scheduling. To the scheduling section 310 are input transmission data and retransmission instructions from the upper station apparatus 30, and a channel estimation value and CQI of a resource block from the reception section that measures the uplink signal.

Further, the scheduling section 310 performs scheduling of uplink and downlink control information and uplink and downlink shared channel signals, while referring to the input retransmission instructions, channel estimation value and CQI. In the propagation path in mobile communications, variations vary for each frequency by frequency selective fading. Then, for the user data to each user terminal 10, the scheduling section 310 indicates a resource block (mapping position) with good communication quality for each subframe (called adaptive frequency scheduling). In adaptive frequency scheduling, a user terminal 10 of good propagation path quality is selected for each resource block. Therefore, the scheduling section 310 uses CQIs on a basis of a resource block transmitted from each user terminal 10 as feedback to indicate the resource block (mapping position).

Similarly, the scheduling section 310 indicates a resource block (mapping position) with good communication quality for each subframe, for control information transmitted on the enhanced PDCCH by adaptive frequency scheduling and the like. Therefore, the scheduling section 310 uses CQIs on a basis of a resource block transmitted from each user terminal 10 as feedback to indicate the resource block (mapping position).

Further, the scheduling section 310 controls the number of aggregation corresponding to the propagation path conditions with the user terminal 10. The section 310 controls the number of CCE aggregation in the case of the PDCCH, while controlling the number of CCE aggregation (with cross interleaving) or the number of VRB aggregation (without cross interleaving) in the case of the enhanced PDCCH. The number of CCE aggregation and the number of VRB aggregation are increased for a cell-edge user. Further, the section 310 determines an MCS (coding rate, modulation scheme) meeting a predetermined block error rate in the allocated resource block. Parameters satisfying the MCS (coding rate, modulation scheme) determined in the scheduling section 310 are set on channel coding sections 303, 308, and 312 and modulation sections 304, 309 and 313.

The baseband signal processing section 204 is provided with channel coding sections 303, modulation sections 304 and mapping sections 305 that support the maximum number N of multiplexed users in a single component carrier. The channel coding sections 303 perform channel coding on the downlink shared data channel (PDSCH) comprised of user data (including apart of higher control signal) output from the data generating sections 301 for each user. The modulation sections 304 modulate the channel-coded user data for each user. The mapping sections 305 map the modulated user data to radio resources.

Each downlink control information generating section 306 generates control information (DL assignment) for the downlink shared data channel to control the downlink shared data channel (PDSCH). The control information for the downlink shared data channel is generated for each user. The control information for the downlink shared data channel is capable of being a configuration including the ARI field to designate a radio resource of the PUCCH. For example, bits for the ARI field are added to DCI Format 1A, 2A, etc. Further, the baseband signal processing section 204 is provided with a downlink common channel control information generating section 307 that generates control information for the downlink common control channel that is downlink control information common to users.

Further, the baseband signal processing section 204 is provided with uplink control information generating sections 311, channel coding sections 312, and modulation sections 313. Each uplink control information generating section 311 generates control information (UL Grant, etc.) for the uplink shared data channel to control the uplink shared data channel (PUSCH). The control information for the uplink shared data channel is generated for each user.

A cell-specific reference signal generating section 318 generates a cell-specific reference signal (CRS) used in various purposes such as channel estimation, symbol synchronization, CQI measurement, and mobility measurement. Further, a user-specific reference signal generating section 320 generates a DM-RS that is a user-specific reference signal for downlink demodulation.

The control information modulated for each user in the above-mentioned modulation sections 309 and 313 is multiplexed in a control channel multiplexing section 314. The downlink control information for the PDCCH is multiplexed into 1 to 3 OFDM symbols from the starting in a subframe, and interleaved in an interleave section 315. Meanwhile, the downlink control information for the enhanced PDCCH (FRM type PDCCH) is frequency-division multiplexed into radio resources after the predetermined number of symbols of the subframe, and is mapped to a resource block (PRB) in a mapping section 319. In this case, the mapping section 319 performs mapping based on instructions from the scheduling section 310. In addition, the mapping section 319 may perform mapping by applying not only without cross interleaving, but also with cross interleaving.

A precoding weight multiplying section 321 controls (shifts) phases and/or amplitude of transmission data and user-specific demodulation reference signal (DM-RS) mapped to subcarriers for each of a plurality of antennas. The section 321 outputs the transmission data and user-specific demodulation reference signal (DM-RS) with the phases and/or amplitude shifted by the precoding weight multiplying section 321 to an IFFT section 316.

To the IFFT section 316 are input control signals from the interleave section 315 and mapping section 319, and the user data from the mapping section 305. The IFFT section 316 performs Inverse Fast Fourier Transform on a downlink channel signal to transform the signal in the frequency domain into a time-series signal. A cyclic prefix inserting section 317 inserts a cyclic prefix into the time-series signal of the downlink channel signal. In addition, the cyclic prefix functions as a guard interval to absorb the difference in multipath propagation delay. The transmission data with the cyclic prefix added is output to the transmission/reception section 203.

Figure 19:
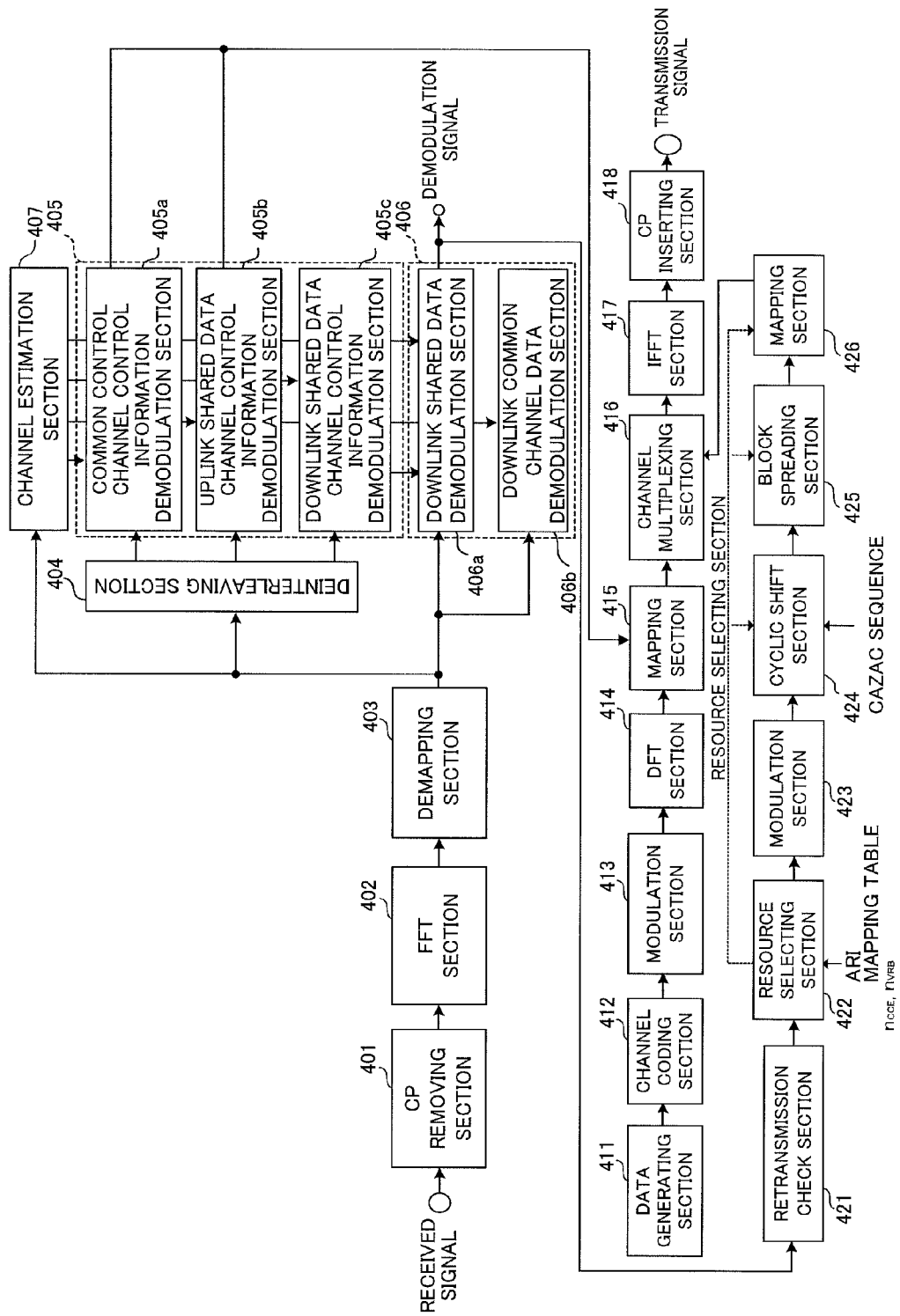
FIG. 19 is a functional block diagram of a baseband processing section of the user terminal according to the Embodiment.

FIG. 19 is a functional block diagram of the baseband signal processing section 104 that the user terminal 10 has, and illustrates functional blocks of an LTE-A terminal that supports LTE-A.

A CP removing section 401 removes the CP from a downlink signal received from the radio base station apparatus 20 as reception data. The CP-removed downlink signal is input to an FFT section 402. The FFT section 402 performs Fast Fourier Transform (FFT) on the downlink signal, and transforms the signal in the time domain into a signal in the frequency domain to output to a demapping section 403. The demapping section 403 demaps the downlink signal, and extracts multiplexing control information with a plurality of pieces of control information multiplexed, user data and higher control signal from the downlink signal. In addition, the demapping processing in the demapping section 403 is performed based on the higher control signal input from the application section 105. The multiplexing control information output from the demapping section 403 is deinterleaved in a deinterleave section 404. In addition, such a configuration is capable of being made that the enhanced PDCCH signal that is not interleaved is input to a control information demodulation section 405 without through the deinterleave section 404.

Further, the baseband signal processing section 104 is provided with a control information demodulation section 405 that demodulates control information, a data demodulation section 406 that demodulates downlink shared data, and a channel estimation section 407. The control information demodulation section 405 is provided with a common control channel control information demodulation section 405a that demodulates control information for the downlink common control channel from the multiplexing control information, an uplink shared data channel control information demodulation section 405b that demodulates control information for the uplink shared data channel from the multiplexing control information, and a downlink shared data channel control information demodulation section 405c that demodulates control information for the downlink shared data channel from the multiplexing control information. The data demodulation section 406 is provided with a downlink shared data demodulation section 406a that demodulates user data and higher control information, and a downlink common channel data demodulation section 406b that demodulates downlink common channel data.

The common control channel control information demodulation section 405a extracts the control information for the common control channel that is control information common to users by blind decoding processing of a common search space of the downlink control channel (PDCCH), demodulation processing, channel decoding processing and the like. The control information for the common control channel includes downlink channel quality information (CQI), is input to a mapping section 415, and is mapped as part of transmission data to the radio base station apparatus 20.

The uplink shared data channel control information demodulation section 405b demodulates the control information (for example, UL Grant) for the uplink shared data channel by blind decoding processing of a user-specific search space of the downlink control channel (PDCCH), demodulation processing, channel decoding processing and the like. The demodulated control information for the uplink shared data channel is input to the mapping section 415, and is used in controlling the uplink shared data channel (PUSCH).

The downlink shared data channel control information demodulation section 405c demodulates the control information (for example, DL assignment) for the user-specific downlink shared data channel by blind decoding processing of the user-specific search space of the downlink control channel (PDCCH), demodulation processing, channel decoding processing and the like. The demodulated control information for the downlink shared data channel is input to the downlink shared data demodulation section 406, is used in controlling the downlink shared data channel (PDSCH), and is input to the downlink shared data demodulation section 406a.

The control information demodulation section 405 performs the blind decoding processing on a plurality of CCE candidates in the case of the normal PDCCH and enhanced PDCCH with cross interleaving. Meanwhile, the section 405 performs the blind decoding processing on a plurality of VRB candidates in the case of the enhanced PDCCH without cross interleaving.

The downlink shared data demodulation section 406a acquires the user data and higher control information, based on the control information for the downlink shared data channel input from the downlink shared data channel control information demodulation section 405c. The PRB position (VRB position) to which the enhanced PDCCH can be mapped included in the higher control information is input to the downlink shared data channel control information demodulation section 405c. The downlink common channel data demodulation section 406b demodulates downlink common channel data, based on the control information for the uplink shared data channel input from the uplink shared data channel control information demodulation section 405b.

The channel estimation section 407 performs channel estimation using the user-specific reference signal (DM-RS) or cell-specific reference signal (CRS). The section 407 performs channel estimation using the cell-specific reference signal, in the case of demodulating the normal PDCCH and enhanced PDCCH with cross interleaving. Meanwhile, the section 407 performs channel estimation using the DM-RS and CRS, in the case of demodulating the enhanced PDCCH without cross interleaving and user data. The section 407 outputs the estimated channel variation to the common control channel control information demodulation section 405a, uplink shared data channel control information demodulation section 405b, downlink shared data channel control information demodulation section 405c, and downlink shared data demodulation section 406a. These demodulation sections perform demodulation processing using the estimated channel variation and reference signal for demodulation.

The baseband signal processing section 104 is provided with a data generating section 411, channel coding section 412, modulation section 413, DFT section 414, mapping section 415, channel multiplexing section 416, IFFT section 417 and CP inserting section 418, as functional blocks of a transmission processing system. Further, the baseband signal processing section 104 is provided with a retransmission check section 421, resource selecting section 422, modulation section 423, cyclic shift section 424, block spreading section 425 and mapping section 426, as functional blocks of a transmission processing system for the PUCCH.

The data generating section 411 generates transmission data from bit data input from the application section 105. The channel coding section 412 performs channel coding processing such as error correction on the transmission data, and the modulation section 413 modulates the channel-coded transmission data with QPSK or the like. The DFT section 414 performs discrete Fourier transform on the modulated transmission data. The mapping section 415 maps each frequency component of the DFT-processed data symbol to a subcarrier position instructed from the radio base station apparatus 20. Further, the mapping section 415 outputs the mapped signal to the channel multiplexing section 416.

The retransmission check section 421 performs a retransmission check on the PDSCH signal, based on the PDCCH signal or enhanced PDCCH signal, and outputs a retransmission response signal. When a plurality of CCs is assigned to communications with the radio base station apparatus, the section 421 determines whether or not the PDSCH signal is received without error for each CC. The retransmission check section 421 outputs the retransmission response signal to the resource selecting section 422. Herein, shown is the case of transmitting the retransmission response signal on the PUCCH (the case where the PUSCH signal is not present in the subframe in transmission). When the retransmission response signal is included in the PUSCH to transmit, the retransmission response signal is multiplexed with the data signal.

As shown the above-mentioned Embodiment, the resource selecting section 422 selects a radio resource used in transmission of the retransmission response signal, based on the CCE index associated with the PDCCH signal or enhanced PDCCH signal, VRB index associated with the enhanced PDCCH signal, ARI, mapping table or the like. The information of selected radio resource is notified to the modulation section 423, cyclic shift section 424, block spreading section 425, and mapping section 426.

The modulation section 423 performs phase modulation (PSK data modulation) based on the information notified from the resource selecting section 422. The cyclic shift section 424 performs orthogonal multiplexing using the cyclic shift of a CAZAC (Constant Amplitude Zero Auto Correlation) code sequence. In addition, the cyclic shift amount varies for each user, and is associated with the cyclic shift number. The cyclic shift section 424 outputs the cyclic-shifted signal to the block spreading section (orthogonal code multiplying means) 425. The block spreading section 425 multiplies the cyclic-shifted reference signal by an orthogonal code (performs block spreading). Herein, the OCC (block spreading code number) used in the reference signal may be notified from the higher layer by RRC signaling or the like, or the OCC beforehand associated with the CS of the data symbol may be used. The block spreading section 425 outputs the block-spread signal to the mapping section 426.

The mapping section 425 maps the block-spread signal to subcarriers based on the information notified from the resource selecting section 422. Further, the mapping section 426 outputs the mapped signal to the channel multiplexing section 416. The channel multiplexing section 416 time-multiplexes the signals from the mapping sections 415, 426 to be a transmission signal including the uplink control channel signal. The IFFT section performs IFFT on the channel-multiplexed signal to transform into a signal in the time domain. The IFFT section 417 outputs the IFFT-processed signal to the CP inserting section 418. The CP inserting section 418 adds a CP to the signal multiplied by the orthogonal code. Then, an uplink transmission signal is transmitted to the radio communication apparatus using the uplink channel.

In addition, the above-mentioned description describes the case of orthogonal-multiplexing users using the cyclic shift of a CAZAC code sequence and transmitting a retransmission response signal as feedback when the user terminal transmits the uplink control information in uplink, but the invention is not limited thereto.

In the above-mentioned description, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2011-103172 filed on May 2, 2011, entire content of which is expressly incorporated by reference herein.

The invention claimed is:

1. A user terminal comprising:
   a receiver that receives a downlink control signal subjected to frequency division multiplexing with a downlink data signal into radio resources;
   a processor that performs a retransmission check on the downlink data signal to output a retransmission response signal; and
   the processor selects a radio resource of an uplink control channel to use for transmission of the retransmission response signal,
   wherein the processor selects the radio resource of the uplink control channel to use for transmission of the retransmission response signal by using different equations,
   wherein when the downlink control signal is allocated to one physical resource block (PRB) in downlink (DL), the processor selects the radio resource of the uplink control channel to use for transmission of the retransmission response signal by using a first equation, and
   when the downlink control signal is allocated to a plurality of different PRBs in DL such that one control channel element (CCE) is mapped over the different PRBs, the CCE being a control channel element for an enhanced physical downlink control channel (enhanced PDCCH), the processor selects the radio resource of the uplink control channel to use for transmission of the retransmission response signal by using a second equation.

2. The user terminal according to claim 1, wherein the processor selects the radio resource that is designated in an ARI (ACK/NACK Resource Indicator) field of the downlink control signal from among a plurality of beforehand notified radio resources.

3. The user terminal according to claim 1, wherein the receiver receives the downlink control signal and the downlink data signal from each of a plurality of component carriers, and
   the processor selects the radio resource to use for transmission of the retransmission response signal from radio resources of an uplink control channel of a particular component carrier, by referring to a mapping table that defines combinations of retransmission response signals to downlink data signals of the component carriers using a plurality of radio resources and bit information of a phase modulation scheme.

4. The user terminal according to claim 3, wherein the processor designates at least one of the radio resources used in the mapping table, based on a CCE index associated with the downlink control signal, when assignment of a downlink control channel for the downlink control signal is performed to the different PRBs of a CCE.

5. The user terminal according to claim 3, wherein the processor designates a radio resource designated in an ARI field of the downlink control signal from among a plurality of beforehand notified radio resources, as at least one of the radio resources used in the mapping table.

6. The user terminal according to claim 3, wherein the processor designates a radio resource based on a CCE index associated with the downlink control signal of the particular component carrier as one of the radio resources used in the mapping table, while designating a radio resource designated in an ARI field of the downlink control signal of another component carrier, as one of the radio resources used in the mapping table.

7. The user terminal according to claim 4, wherein when cross carrier scheduling is applied, the processor designates a plurality of radio resources used in the mapping table, based on a CCE index associated with the downlink control signal of each of the component carriers.

8. The user terminal according to claim 1, wherein the processor receives downlink control signals and downlink data signals from a plurality of component carriers, and the processor selects a radio resource designated in an ARI field of the downlink control signal assigned to each of the plurality of component carriers from among a plurality of beforehand notified radio resources.

9. A radio base station apparatus comprising:
a processor that generates a downlink control signal and a downlink data signal to a user terminal;
a transmitter that performs frequency division multiplexing on the downlink control signal and the downlink data signal into radio resources to transmit; and
a receiver that receives a retransmission response signal of the downlink data signal subjected to a retransmission check in the user terminal,
wherein the receiver receives the retransmission response signal in a radio resource that the user terminal selects by using different equations,
wherein when the downlink control signal is allocated to one physical resource block (PRB) in downlink (DL), the user terminal selects the radio resource of the uplink control channel to use for transmission of the retransmission response signal by using a first equation, and
when the downlink control channel is allocated to a plurality of different PRBs in DL such that one control channel element (CCE) is mapped over the different PRBs, the CCE being a control channel element for an enhanced physical downlink control channel (enhanced PDCCH), the user terminal selects the radio resource of the uplink control channel to use for transmission of the retransmission response signal by using a second equation.

10. The radio base station apparatus according to claim 9, wherein the processer includes an ARI (ACK/NACK Resource Indicator) field to designate the radio resource of an uplink control channel used for the user terminal to transmit the retransmission response signal in the downlink control signal.

11. A radio communication method in which a radio base station apparatus transmits a downlink control signal and a downlink data signal generated therein to a user terminal, and the user terminal transmits a retransmission response signal to the downlink data signal received therein to the radio base station apparatus as feedback, comprising:
in the radio base station apparatus,
performing frequency division multiplexing on a downlink control signal and a downlink data signal into radio resources to transmit to the user terminal; and
in the user terminal,
outputting a retransmission response signal to the downlink data signal,
selecting a radio resource of an uplink control channel to use for transmission of the retransmission response signal by using different equations,
wherein when the downlink control signal is allocated to one physical resource block (PRB) in downlink (DL), the user terminal selects the radio resource of the uplink control channel to use for transmission of the retransmission response signal by using a first equation, and
when the downlink control signal is allocated to a plurality of different PRBs in DL such that one control channel element (CCE) is mapped over the different PRBs, the CCE being a control channel element for an enhanced physical downlink control channel (enhanced PDCCH), the user terminal selects the radio resource of the uplink control channel to use for transmission of the retransmission response signal by using a second equation, and
transmitting the retransmission response signal to the radio base station apparatus.

12. A radio communication system in which a radio base station apparatus transmits a downlink control signal and a downlink data signal generated therein to a user terminal, and the user terminal transmits a retransmission response signal to the downlink data signal received therein to the radio base station apparatus as feedback,
the radio base station apparatus comprises:
a first processor that generates the downlink control signal and the downlink data signal to the user terminal, and
a transmitter that performs frequency division multiplexing on the downlink control signal and the downlink data signal into radio resources to transmit, and
the user terminal comprises:
a receiver that receives the downlink control signal from the radio base station apparatus,
a second processor that performs a retransmission check on the downlink data signal to output a retransmission response signal, and
the second processor selects a radio resource of an uplink control channel to use for transmission of the retransmission response signal,
wherein the second processor selects the radio resource of the uplink control channel to use for transmission of the retransmission response signal by using different equations,
wherein when the downlink control channel signal is allocated to one physical resource block (PRB) in downlink (DL), the second processor selects the radio resource of the uplink control channel to use for transmission of the retransmission response signal by using a first equation, and
when the downlink control channel is allocated to a plurality of different PRBs in DL such that one control channel element (CCE) is mapped over the different PRBs, the CCE being a control channel element for an enhanced physical downlink control channel (enhanced PDCCH), the second processor selects the radio resource of the uplink control channel to use for transmission of the retransmission response signal by using a second equation.

13. The user terminal according to claim 1, wherein, when the downlink control signal is allocated to the different PRBs in DL such that one CCE is mapped over the different PRBs, the processor selects the radio resource of the uplink control channel to use for transmission of the retransmission response signal by using a CCE index and when the downlink control signal is allocated to the one PRB, the processor selects the radio resource of the uplink control channel to use for transmission of the retransmission response signal by using a resource block index.

* * * * *